US012764668B2

(12) United States Patent
MolavianJazi et al.

(10) Patent No.: US 12,764,668 B2
(45) Date of Patent: Oct. 13, 2026

(54) PRIORITIZATION OF UPLINK TRANSMISSIONS BY REPEATERS

(71) Applicant: Samsung Electronics Co., Ltd., Suwon-si (KR)

(72) Inventors: Ebrahim MolavianJazi, San Jose, CA (US); Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 18/604,372

(22) Filed: Mar. 13, 2024

(65) Prior Publication Data

US 2024/0323857 A1 Sep. 26, 2024

Related U.S. Application Data

(60) Provisional application No. 63/453,986, filed on Mar. 22, 2023.

(51) Int. Cl.
*H04W 52/14* (2009.01)
*H04L 5/14* (2006.01)
(Continued)

(52) U.S. Cl.
CPC ......... *H04W 52/146* (2013.01); *H04L 5/1469* (2013.01); *H04W 52/28* (2013.01); *H04W 52/367* (2013.01)

(58) Field of Classification Search
CPC . H04W 52/146; H04W 52/28; H04W 52/367; H04W 52/281; H04W 52/46; H04L 5/1469
See application file for complete search history.

(56) References Cited

U.S. PATENT DOCUMENTS

2024/0114452 A1* 4/2024 Abedini .............. H04W 52/028
2024/0114538 A1* 4/2024 Abedini ................ H04W 72/20
(Continued)

FOREIGN PATENT DOCUMENTS

WO 2022253993 A2 12/2022

OTHER PUBLICATIONS

International Search Report and Written Opinion issued Jun. 18, 2024 regarding International Application No. PCT/KR2024/095617, 8 pages.

(Continued)

*Primary Examiner* — Kibrom T Hailu

(57) ABSTRACT

Apparatuses and methods for prioritization of uplink transmissions by repeaters. A method for a network-controlled repeater (NCR) includes receiving, by an NCR mobile termination (NCR-MT) entity, first information for a first uplink transmission by the NCR-MT entity and second information for a second uplink transmission by an NCR forward (NCR-Fwd) entity that overlap in one or more symbols. The method further includes identifying a power limit for simultaneous transmission by the NCR-MT and NCR-Fwd, determining first and second powers for the first and second uplink transmissions, respectively, and when a sum of the first and second powers in the one or more symbols exceeds the power limit, third and fourth powers for the first and second uplink transmissions, respectively, that do not exceed the power limit. The method further includes transmitting, in the one or more symbols, the first and second uplink transmissions with the third and fourth powers, respectively.

20 Claims, 16 Drawing Sheets

(51) Int. Cl.
*H04W 52/28* (2009.01)
*H04W 52/36* (2009.01)

(56) References Cited

U.S. PATENT DOCUMENTS

| | | | | |
|---|---|---|---|---|
| 2024/0163882 | A1* | 5/2024 | Yin | H04W 72/23 |
| 2025/0266898 | A1* | 8/2025 | Liu | H04B 7/155 |
| 2026/0006648 | A1* | 1/2026 | Zhu | H04B 7/15528 |
| 2026/0032451 | A1* | 1/2026 | Liu | H04W 16/10 |
| 2026/0032746 | A1* | 1/2026 | Kurita | H04W 76/15 |
| 2026/0046858 | A1* | 2/2026 | Kurita | H04W 72/046 |
| 2026/0046894 | A1* | 2/2026 | Guan | H04B 7/0695 |
| 2026/0051972 | A1* | 2/2026 | Bhamri | H04L 1/1812 |
| 2026/0051973 | A1* | 2/2026 | Bhamri | H04L 1/1812 |
| 2026/0074868 | A1* | 3/2026 | Bhamri | H04L 5/0055 |
| 2026/0122720 | A1* | 4/2026 | Han | H04W 76/27 |

OTHER PUBLICATIONS

KDDI, "Discussion on side control information and NCR behavior", 3GPP TSG RAN WG1 #112, R1-2301136, Feb. 2023, 3 pages.
Moderator (ZTE), "Summary#4 of discussion on side control information", 3GPP TSG RAN WG1 #112, R1-2302035, Feb. 2023, 45 pages.
Vivo, "Discussion on side control information and NCR behavior", 3GPP TSG RAN WG1 #110bis-e , R1-2208656, Oct. 2022, 9 pages.
Catt, "Discussion on side control information and NCR behavior", 3GPP TSG RAN WG1 #111, R1-2211211, Nov. 2022, 17 pages.
"5G; NR; Physical channels and modulation (3GPP TS 38.211 version 17.4.0 Release 17)", ETSI TS 138 211 V17.4.0, Jan. 2023, 141 pages.
"5G; NR; Multiplexing and channel coding (3GPP TS 38.212 version 17.4.0 Release 17)", ETSI TS 138 212 V17.4.0, Jan. 2023, 206 pages.
"5G; NR; Physical layer procedures for control (3GPP TS 38.213 version 17.4.0 Release 17)", ETSI TS 138 213 V17.4.0, Jan. 2023, 263 pages.
"5G; NR; Physical layer procedures for data (3GPP TS 38.214 version 17.4.0 Release 17)", ETSI TS 138 214 V17.4.0, Jan. 2023, 236 pages.
"3rd Generation Partnership Project; Technical Specification Group Radio Access Network; NR; Physical layer measurements (Release 17)", 3GPP TS 38.215 V17.4.0, Dec. 2023, 27 pages.
"5G; NR; Medium Access Control (MAC) protocol specification (3GPP TS 38.321 version 17.3.0 Release 17)", ETSI TS 138 321 V17.3.0, Jan. 2023, 254 pages.
"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.
"5G; NR; NR and NG-RAN Overall description; Stage-2 (3GPP TS 38.300 version 17.3.0 Release 17)", ETSI TS 138 300 V17.3.0, Jan. 2023, 213 pages.
"3rd Generation Partnership Project; Technical Specification Group Services and System Aspects; Study on Ambient power-enabled Internet of Things (Release 19)", 3GPP TR 22.840 V1.0.0, Dec. 2022, 99 pages.
"3rd Generation Partnership Project; Technical Specification Group Radio Access Network; NR; Requirements for support of radio resource management (Release 18)", 3GPP TS 38.133 V18.0.0, Dec. 2022, 5854 pages.
"5G; NR; User Equipment (UE) radio transmission and reception; Part 1: Range 1 Standalone (3GPP TS 38.101-1 version 17.8.0 Release 17)", ETSI TS 138 101-1 V17.8.0, Jan. 2023, 660 pages.
"5G; NR; User Equipment (UE) radio transmission and reception; Part 2: Range 2 Standalone (3GPP TS 38.101-2 version 17.8.0 Release 17)", ETSI TS 138 101-2 V17.8.0, Jan. 2023, 227 pages.
"5G; NR; User Equipment (UE) radio transmission and reception; Part 3: Range 1 and Range 2 Interworking operation with other radios (3GPP TS 38.101-3 version 17.8.0 Release 17)", ETSI TS 138 101-3 V17.8.0, Jan. 2023, 1069 pages.

* cited by examiner

PRIORITIZATION OF UPLINK TRANSMISSIONS BY REPEATERS

CROSS-REFERENCE TO RELATED AND CLAIM OF PRIORITY

The present application claims priority under 35 U.S.C. § 119(e) to U.S. Provisional Patent Application No. 63/453,986 filed on Mar. 22, 2023, which is hereby incorporated by reference in its entirety.

TECHNICAL FIELD

The present disclosure relates generally to wireless communication systems and, more specifically, the present disclosure is related to apparatuses and methods for prioritization of uplink (UL) transmissions by repeaters.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to prioritization of UL transmissions by repeaters.

In one embodiment, a method for a network-controlled repeater (NCR) in a wireless system is provided. The method includes receiving, by an NCR mobile termination (NCR-MT) entity, first information for a first uplink transmission by the NCR-MT entity on a control link (C-link) of the NCR and second information for a second uplink transmission by an NCR forward (NCR-Fwd) entity on a backhaul link (BH-link) of the NCR. The second uplink transmission overlaps with the first uplink transmission in one or more symbols. The method further includes identifying, by the NCR-MT entity, a power limit for simultaneous transmission by the NCR-MT entity and by the NCR-Fwd entity, determining, by the NCR-MT entity: a first power for the first uplink transmission and a second power for the second uplink transmission, and in response to a sum of the first power and the second power in the one or more symbols exceeding the power limit, a third power for the first uplink transmission and a fourth power for the second uplink transmission. A sum of the third power and the fourth power does not exceed the power limit. The method further includes transmitting, by the NCR-MT entity, the first uplink transmission with the third power in the one or more symbols and transmitting, by the NCR-Fwd entity, the second uplink transmission with the fourth power in the one or more symbols.

In another embodiment, a NCR is provided. The NCR includes a transceiver of an NCR-MT entity configured to receive first information for a first uplink transmission by the NCR-MT entity on a C-link of the NCR and second information for a second uplink transmission by an NCR-Fwd entity on a BH-link of the NCR, wherein the second uplink transmission overlaps with the first uplink transmission in one or more symbols. The NCR further includes a processor of the NCR-MT entity operably coupled to the transceiver of the NCR-MT entity. The processor of the NCR-MT entity is configured to identify a power limit for simultaneous transmission by the NCR-MT entity and by the NCR-Fwd entity. The processor of the NCR-MT entity is further configured to determine: a first power for the first uplink transmission and a second power for the second uplink transmission, and in response to a sum of the first power and the second power in the one or more symbols exceeding the power limit, a third power for the first uplink transmission and a fourth power for the second uplink transmission. A sum of the third power and the fourth power does not exceed the power limit. The NCR further includes a transceiver of the NCR-Fwd entity operably coupled to the processor of the NCR-MT entity. The transceiver of the NCR-Fwd entity is configured to transmit the second uplink transmission with the fourth power in the one or more symbols. The transceiver of the NCR-MT entity is further configured to transmit the first uplink transmission with the third power in the one or more symbol.

In yet another embodiment, a base station is provided. The base station includes a transceiver configured to transmit, to a NCR NCR-MT entity, first information for a first uplink reception from the NCR-MT entity on a C-link of the NCR and second information for a second uplink reception from an NCR-Fwd entity on a BH-link of the NCR. The second uplink reception overlaps with the first uplink reception in one or more symbols. The base station further includes a processor operably coupled to the transceiver. The processor is configured to identify a power limit for simultaneous transmission by the NCR-MT entity and by the NCR-Fwd entity. The processor is further configured to determine a first power for the first uplink reception and a second power for the second uplink reception, and in response to a sum of the first power and the second power in the one or more symbols exceeding the power limit, a third power for the first uplink reception and a fourth power for the second uplink reception. A sum of the third power and the fourth power does not exceed the power limit. The transceiver is further configured to receive, from of the NCR-MT entity, the first uplink reception, which is associated with the third power, in the one or more symbols and from the NCR-Fwd entity, the second uplink reception, which is associated with the fourth power, in the one or more symbol.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
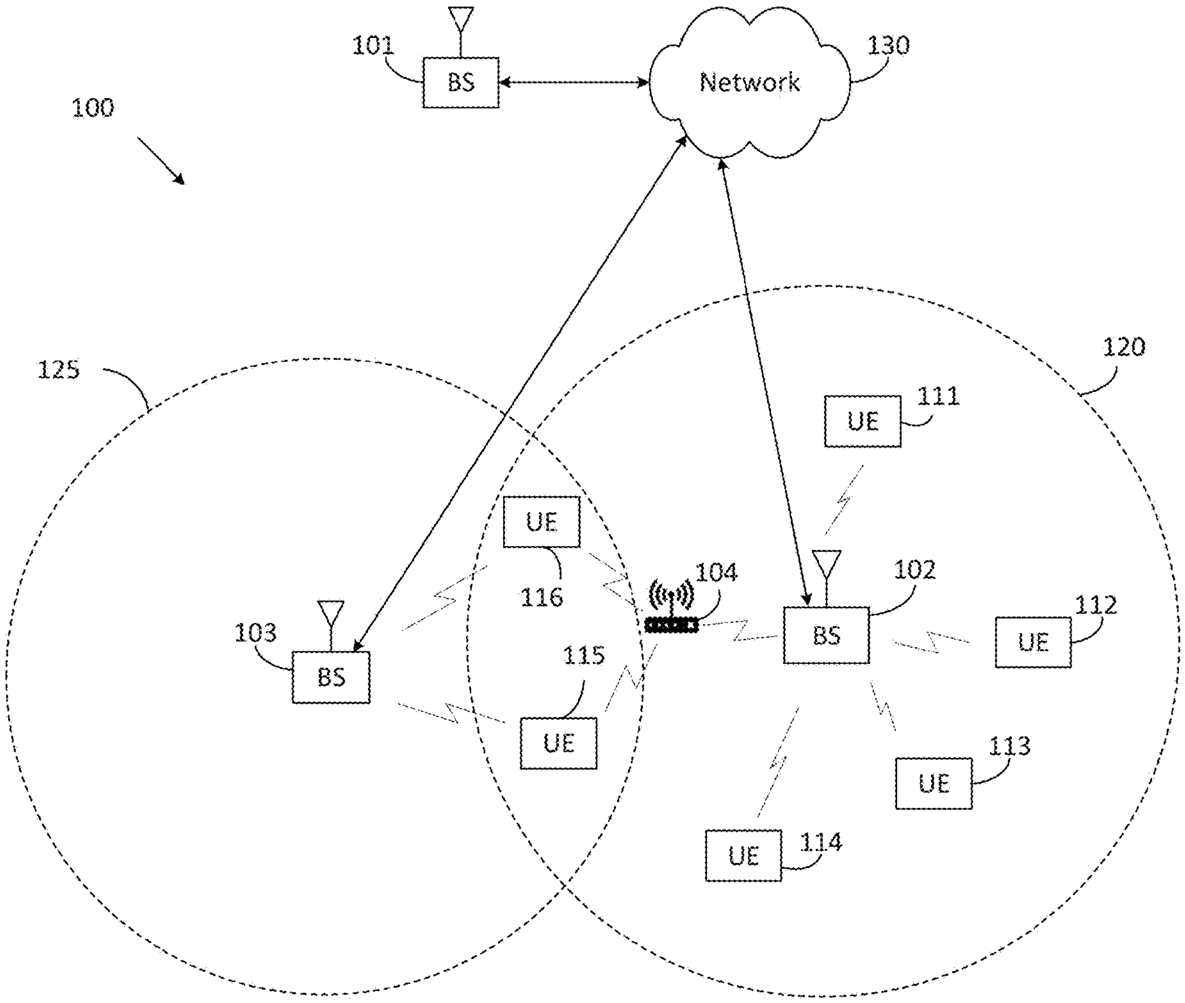
FIG. 1 illustrates an example wireless network according to embodiments of the present disclosure.

FIGS. 1-17, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems.

However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.4.0, "NR; Physical channels and modulation"; [2] 3GPP TS 38.212 v17.4.0, "NR; Multiplexing and channel coding"; [3] 3GPP TS 38.213 v17.4.0, "NR; Physical layer procedures for control"; [4] 3GPP TS 38.214 v17.4.0, "NR; Physical layer procedures for data"; [5] 3GPP TS 38.215 v17.4.0, "NR; Physical layer measurements"; [6] 3GPP TS 38.321 v17.3.0, "NR; Medium Access Control (MAC) protocol specification"; [7] 3GPP TS 38.331 v17.2.0, "NR; Radio Resource Control (RRC) protocol specification"; [8] 3GPP TS 38.300 v17.3.0, "NR; NR and NG-RAN Overall Description; Stage 2"; [9] 3GPP TR 22.840 v1.0.0, "Study on Ambient power-enabled Internet of Things (Rel-19)"; 3GPP TS 38.133 v18.0.0, "NR; Requirements for support of radio resource management"; 3GPP TS 38.101-1, v17.8.0, "NR; User Equipment (UE) radio transmission and reception"; 3GPP TS 38.101-2, v17.8.0, "NR; User Equipment (UE) radio transmission and reception", and 3GPP TS 38.101-3, v17.8.0, "NR; User Equipment (UE) radio transmission and reception".

Figure 2:
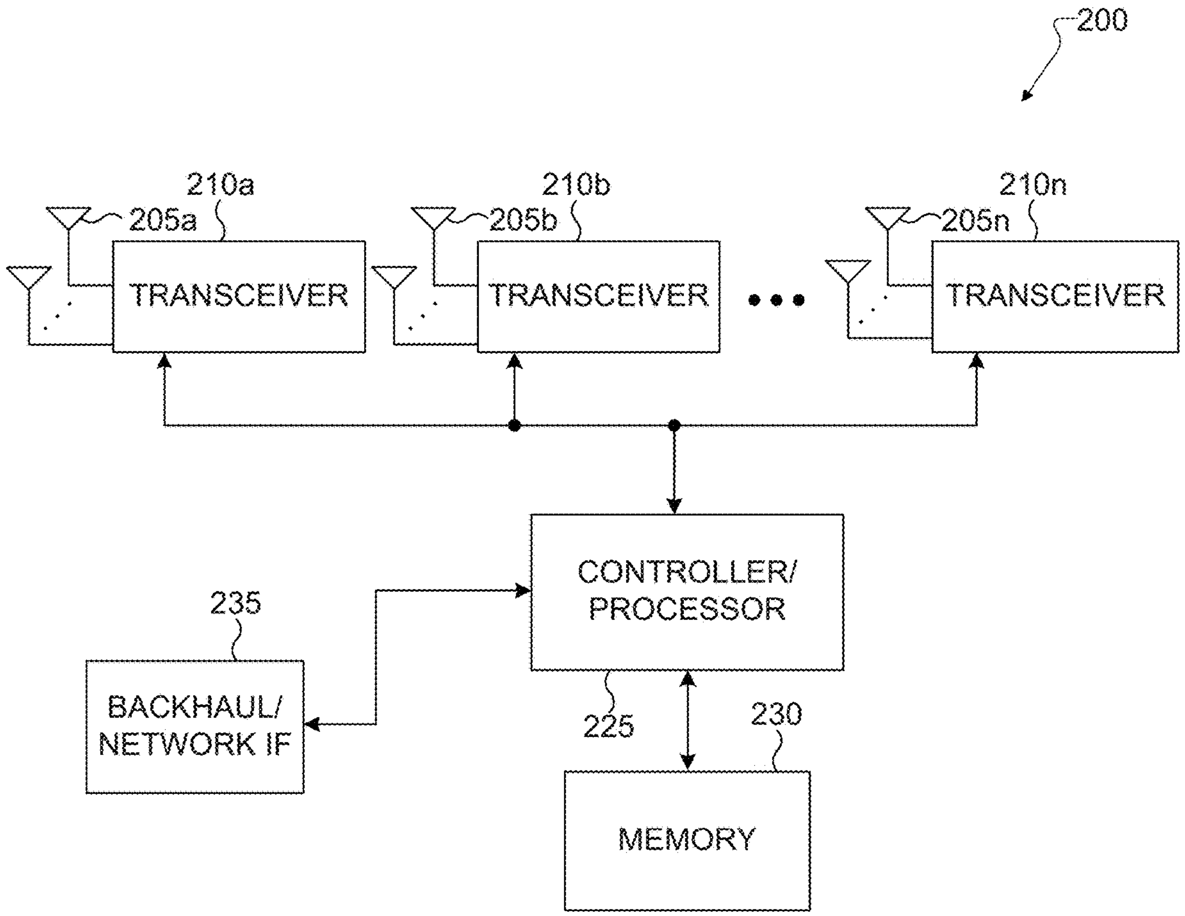
FIG. 2 illustrates an example gNodeB (gNB) according to embodiments of the present disclosure.
Figure 3:
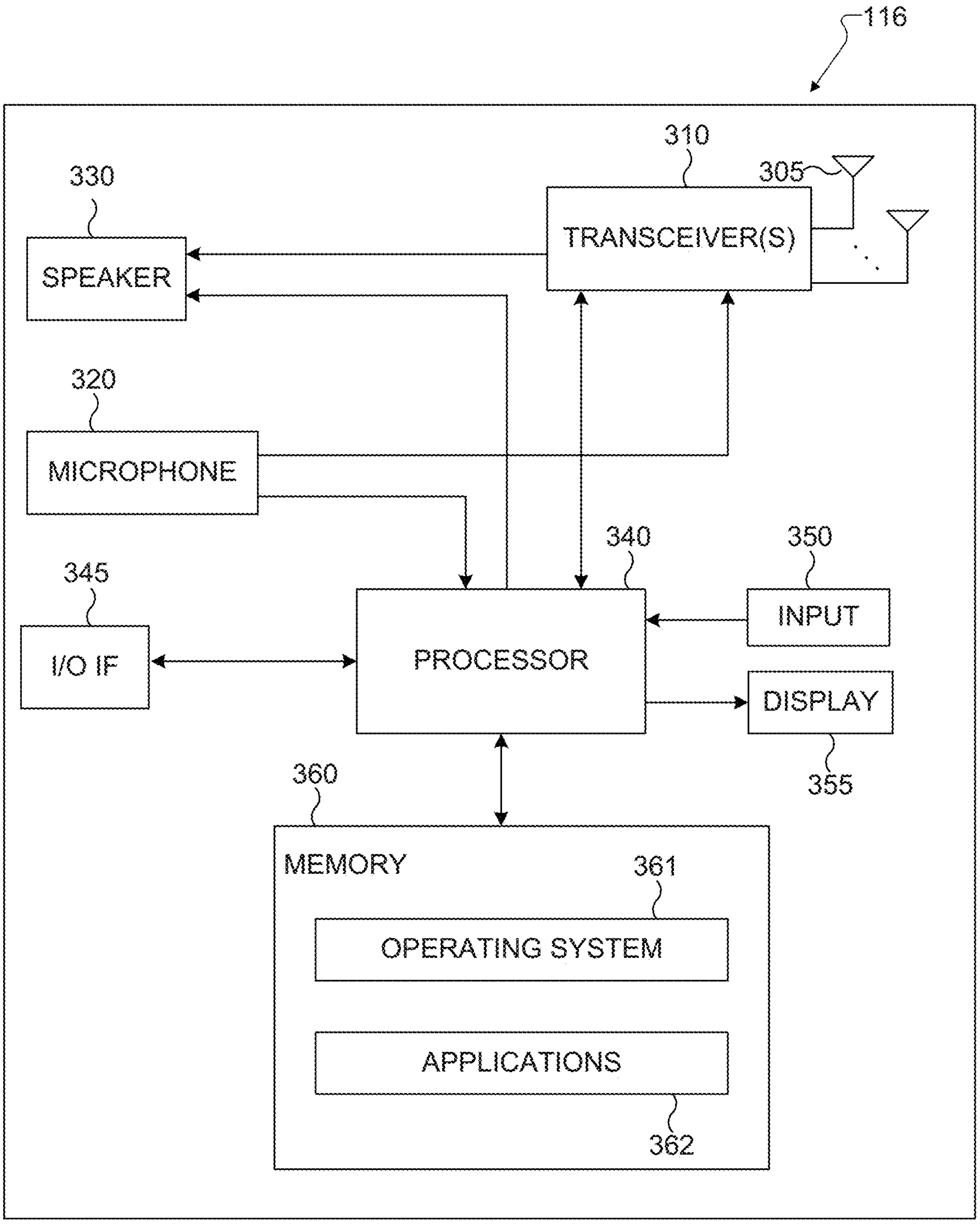
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques. A relay node 104 relays signals between gNB 103 and UE 115. A relay node can be an integrated access and backhaul node (IAB) or NCR.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, a relay node 104 includes circuitry, programing, or a combination thereof, to support a prioritization of UL transmissions by repeaters. In certain embodiments, one or more of the gNBs 101-103 includes circuitry, programing, or a combination thereof, to support prioritization of UL transmissions by repeaters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example TRP 200 according to embodiments of the present disclosure. For example, the TRP 200 any be a base station, such as gNB 101-103, or may be an NCR or SR, such as the relay node 104 in FIG. 1. The embodiment of the TRP 200 illustrated in FIG. 2 is for illustration only. However, TRPs come in a wide variety of configurations, and FIG. 2 does not limit the scope of this disclosure to any particular implementation of a TRP.

As shown in FIG. 2, the TRP 200 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs or gNBs in the network 100. In various embodiments, certain of the transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals. For example, in embodiments where the TRP is a repeater, one or more of the transceivers 210 may be used for an NCR-RU entity or NCR-Fwd entity as a DL connection for signaling over an access link with a UE and/or over a backhaul link with a gNB. In these examples, the associated one(s) of the transceivers 210 for the NCR-RU entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP is a repeater, one or more of the transceivers 210 may be used for an NCR-MT entity as a DL or UL connection for control signaling over a control link (C-link) with a gNB.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the TRP 200. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the TRP 200 by the controller/processor 225.

The controller/processor 225 is also capable of executing programs and other processes resident in the memory 230, processes to support prioritization of UL transmissions by repeaters in accordance with various embodiments of the present disclosure. For The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP is a repeater, the interface 235 may be used for an NCR-RU or NCR-Fwd entity as a backhaul connection with a gNB over a backhaul link for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

In various embodiments, the TRP 200 may be utilized as an NCR or SR. For example, the TRP 200 may communicate with a base station 102 via a wireless backhaul over interface 235 via a NCT-MT entity for control information and may communicate via transceivers 210 with the UE 116 to communicate data information via an NCR-Fwd entity as described in greater detail below.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355, which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
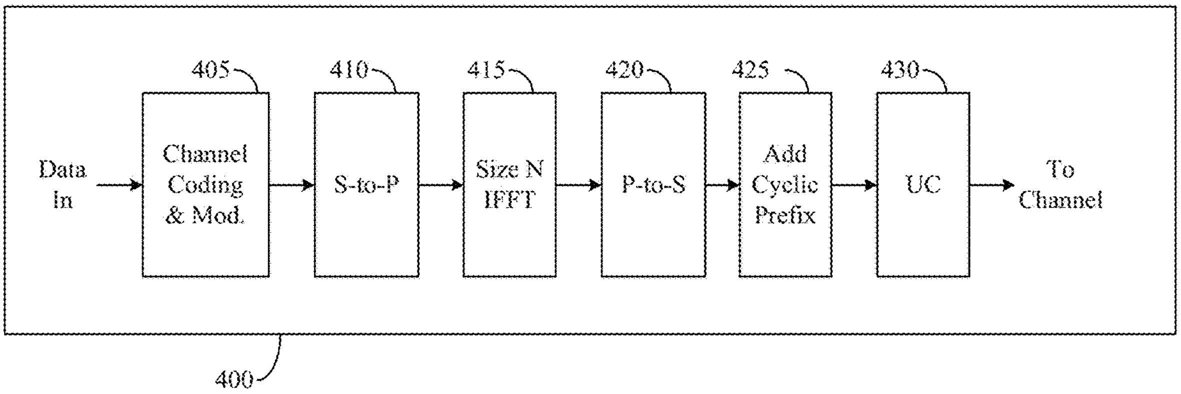
FIGS. 4A and 4B illustrate an example of a wireless transmit and receive paths according to embodiments of the present disclosure.
Figure 4B:
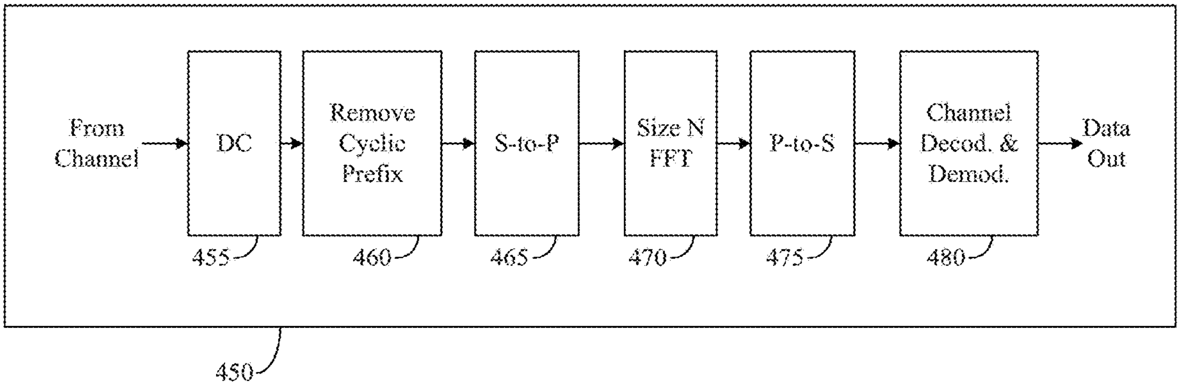

FIG. 4 and FIG. 4B illustrate example wireless transmit and receive paths according to this disclosure. In the following description, a transmit path 400 may be described as being implemented in a gNB or TRP (such as the gNB 102 or TRP 200), while a receive path 450 may be described as being implemented in a UE (such as a UE 116). However, it may be understood that the receive path 450 can be implemented in a gNB or TRP and that the transmit path 400 can be implemented in a UE. In some embodiments, the receive path 450 is configured to support prioritization of UL transmissions by repeaters in a wireless communication system.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 or the TRP 200 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 or the TRP 200 and may implement the receive path 500 for receiving in the downlink from the gNBs 101-103 or the TRP 200.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or sounding RS (SRS). In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5:
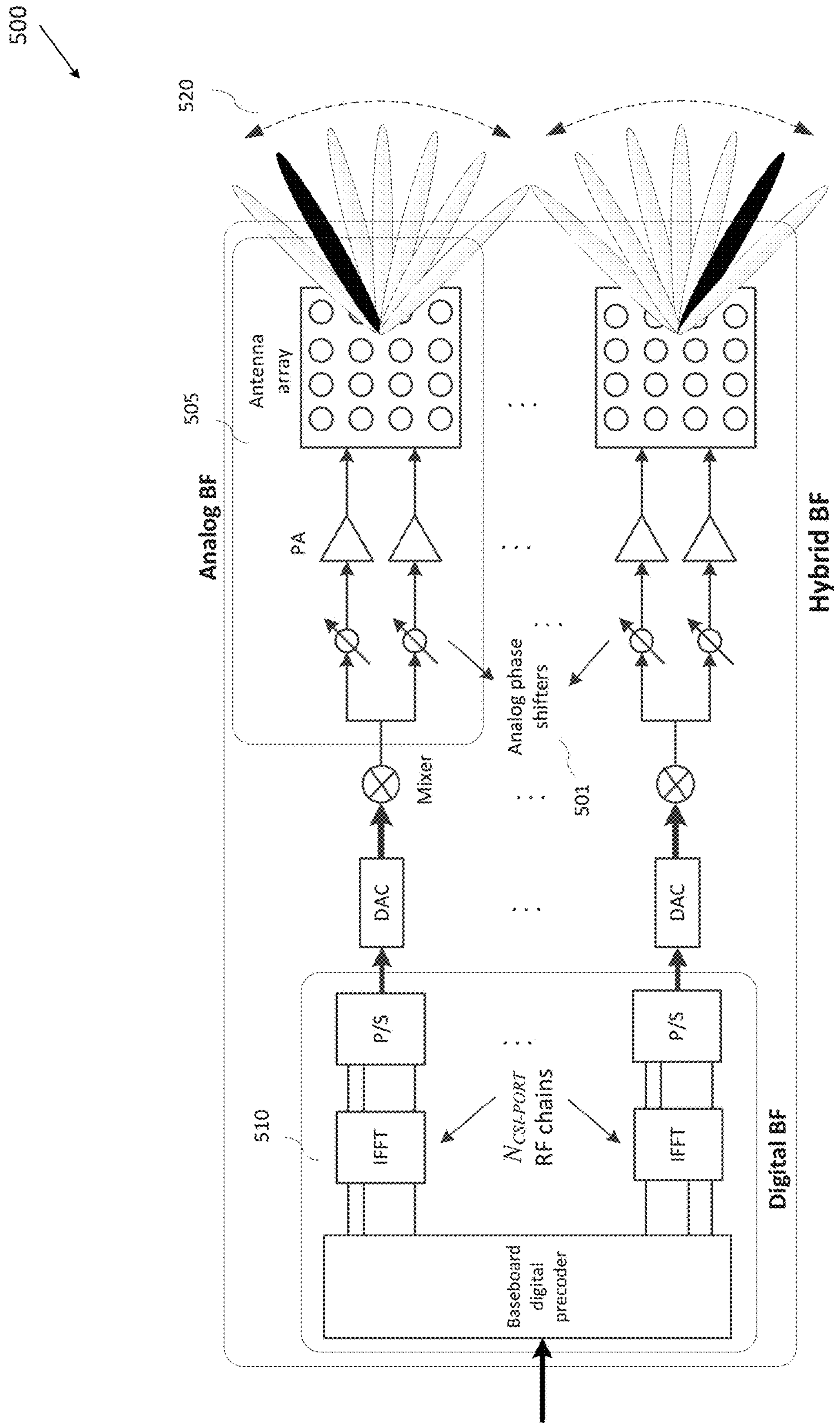
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antennas 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI\text{-}PORT}$. A digital beamforming unit 510 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 500 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

A description of example embodiments is provided on the following pages.

Any of the variation embodiments can be utilized independently or in combination with at least one other variation embodiment.

Throughout this disclosure, all FIGURES such as FIG. 1, FIG. 2, and so on, illustrate examples according to embodiments of the present disclosure. For each FIGURE, the corresponding embodiment shown in the FIGURE is for illustration only. One or more of the components illustrated in each FIGURE can be implemented in specialized circuitry configured to perform the noted functions or one or more of the components can be implemented by one or more processors executing instructions to perform the noted functions. Other embodiments could be used without departing from the scope of the present disclosure. In addition, the descriptions of the FIGUREs are not meant to imply physical or architectural limitations to the manner in which different embodiments may be implemented. Different embodiments of the present disclosure may be implemented in any suitably-arranged communications system.

The present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

A repeater, such as a network-controlled (NetCon) repeater (NCR), also known as a smart repeater, can amplify-and-forward (AF) transmissions or receptions between a gNB (or an Integrated Access and Backhaul (IAB) node) and a UE (or another IAB node) based on side control information, such as beamforming information, received from the gNB. A NCR includes two functional entities: one is a NCR mobile termination (NCR-MT) and the other is a NCR forward unit (NCR-Fwd). The NCR-MT can communicate with a gNB via Control link (C-link) to enable the information exchanges (e.g., the NCR control information). The NCR-Fwd can perform the amplify-and-forward of UL/DL RF signal between gNB and UE via backhaul link and access link, wherein the backhaul link refers to the link between the gNB and NCR-Fwd, while the access link refers to the link between the NCR-Fwd and the UE.

As default capability, an uplink transmission by the NCR-MT on the C-link does not overlap (that is, is TDM) with an uplink transmission by the NCR-Fwd on the backhaul link. The NCR can report a capability to support overlapping or simultaneous an uplink transmission by the NCR-MT on the C-link and an uplink transmission by the NCR-Fwd on the backhaul link.

Embodiments of the present disclosure recognize there is a need to define NCR behavior when a NCR is provided information of overlapping uplink transmissions on the C-link and the backhaul link.

In addition, a NCR can operate with separate or shared RF chains or power amplifiers (PAs) or power resources or RF front end or otherwise subject to a shared power limit for the NCR-MT and NCR-Fwd. Therefore, there is another need to define power allocation between NCR-MT and NCR-Fwd for the case of overlapping uplink transmissions between the C-link and the backhaul link at least for the case of shared RF chains or power amplifiers (PAs) or power resources.

The present disclosure provides methods and apparatus for handling overlapping uplink transmissions on the C-link and backhaul link of a NCR, including prioritization rules or power sharing schemes.

In general, the embodiments apply to any deployments, verticals, or scenarios including FR1 or FR2, with enhanced mobile broadband (eMBB), ultra reliable low latency communications (URLLC) and IIOT and extended reality (XR), massive machine type communication (mMTC) and internet of things (IoT), with sidelink/Vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, multi-cast broadcast services (MBS), and so on. The smart or network-controlled repeater may be ground-based or may be satellite/aerial platform based.

Various embodiments, methods, and examples described in the present disclosure can apply beyond NCR/smart repeaters nodes to other nodes with a repeater/relay-like functionality in a wireless network, such as reconfigurable intelligent surfaces (RIS), or to stationary or non-stationary repeater/relay-like nodes in the sky/sea or other not-on-the-ground situations, for example, satellites in non-terrestrial networks (NTN) or mobile repeaters on buses/trains/vessels/ships/aircrafts/drones, and so on.

Embodiments of the disclosure are summarized in the following and are fully elaborated further herein. Combinations of the embodiments are also applicable, but they are not described in detail for brevity.

- Overlapping uplink transmissions for a NCR without capability for simultaneous uplink transmission on C-link and backhaul link
  - When a NCR does not support simultaneous/overlapping uplink transmissions on the C-link and backhaul link (BH-link), in a first option, the NCR does not expect to be provided configuration or scheduling information for overlapping uplink transmissions on the C-link and the BH-link. In a second option, the NCR may be provided configuration or scheduling information for overlapping uplink transmissions on the C-link and the BH-link, and the NCR determines, based on priority rules, to transmit on the uplink (to the gNB) on only one of the C-link or the BH-link and drops the uplink transmission on the other link.
- Overlapping uplink transmissions for a NCR with the capability for simultaneous uplink transmission on C-link and backhaul link
  - When a NCR:
    - supports simultaneous/overlapping uplink transmissions on the C-link and backhaul link (BH-link),
    - supports or is subject to a total power limit for NCR across the C-link and BH-link, and
    - is provided configuration or scheduling or beam indication information for simultaneous/overlapping uplink transmissions on the C-link and BH-link, with a sum power that exceed the total power limit,
  - in a first option, the NCR may not support a capability for power sharing between C-link and BH-link. The NCR determines, based on priority rules, to transmit uplink on only one of the C-link or the BH-link and drops the other uplink transmission on the other link. In a second option, the NCR supports power sharing between C-link and BH-link. The NCR reduces (including to zero) transmission power for uplink transmissions on one or both of the C-link and BH-link, such that a sum power after power reduction does not exceed the total power limit for the NCR. A NCR can also support other modes of power sharing, such as dynamic power sharing with or without look ahead, semi-static power sharing, or single uplink operation.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB 102 can configure the UE 116 to transmit signals on a cell within an active UL bandwidth part (BWP) of the cell UL BW.

UCI includes hybrid automatic repeat request (HARQ) acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE 116 to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a time division duplexing (TDD) system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE 116 may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE 116 may not assume quasi co-location for any other synchronization signal SS/PBCH block transmissions.

In absence of CSI-RS configuration, and unless otherwise configured, the UE 116 may assume PDSCH DM-RS and SSB to be quasi co-located with respect to Doppler shift, Doppler spread, average delay, delay spread, and, when applicable, spatial Rx parameters. The UE 116 may assume that the PDSCH DM-RS within the same code division multiplexing (CDM) group is quasi co-located with respect to Doppler shift, Doppler spread, average delay, delay spread, and spatial Rx. The UE 116 may also assume that DM-RS ports associated with a PDSCH are QCL with QCL type A, type D (when applicable) and average gain. The UE 116 may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE 116 and the given serving cell, where M depends on the UE 116 capability maxNumber-ConfiguredTCIstatesPerCC. Each TCI-State contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type 1 for the first DL RS and qcl-Type 2 for the second DL RS (if configured). For the case of two DL RSs, the QCL types shall not be the same regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE 116 receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $$n + 3N_{slot}^{subframe,\mu}$$

where $$N_{slot}^{subframe,\mu}$$

is a number of slot per subframe for subcarrier spacing (SCS) configuration μ.

The UE 116 receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE 116 determines a common TDD UL-DL frame configuration of a serving cell by receiving a SIB such as a SIB1 when accessing the cell from RRC_IDLE or by RRC signaling when the UE 116 is configured with SCells or additional secondary cell groups (SCGs) by an IE Serving-CellConfigCommon in RRC_CONNECTED. The UE 116 determines a dedicated TDD UL-DL frame configuration using the IE ServingCellConfig when the UE 116 is configured with a serving cell, e.g., add or modify, where the serving cell may be the SpCell or an SCell of an master cell group (MCG) or secondary cell group (SCG). A TDD UL-DL frame configuration designates a slot or symbol as one of types 'D', 'U' or 'F' using at least one time-domain pattern with configurable periodicity.

In the following, for brevity of description, slot format indication (SFI) refers to a slot format indicator as example that is indicated using higher layer provided IEs such as slotFormatCombination or slotFormatCombinationsPerCell and which is indicated to the UE 116 by group common DCI format such as DCI F2_0 where slotFormats are defined in REF3.

Throughout the present disclosure, the term "configuration" or "higher layer configuration" and variations thereof (such as "configured" and so on) are used to refer to one or more of: a system information signaling such as by a Master Information Block (MIB) or a System Information Block (SIB) (such as SIB1), a common or cell-specific higher layer/RRC signaling, or a dedicated or UE-specific or BWP-specific higher layer/RRC signaling.

Throughout the present disclosure, the term signal quality is used to refer to e.g., reference signal received power (RSRP), or reference signal received quality (RSRQ) or received signal strength indicator (RSSI) or signal to noise ratio (SNR) or signal to interference and noise ratio (SINR), with or without filtering such as L1 or L3 filtering, of a channel or a signal such as a reference signal (RS) including SSB, CSI-RS, or SRS.

The Synchronization Signal and PBCH block (SSB) includes primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network 130. During a half-frame, different SSBs may be transmitted in different spatial directions (i.e., using different beams, spanning the coverage area of a cell).

Within the frequency span of a carrier, multiple SSBs can be transmitted. The physical cell IDs (PCIs) of SSBs transmitted in different frequency locations do not have to be unique, i.e., different SSBs in the frequency domain can have different PCIs. However, when an SSB is associated with a remaining minimum system information (RMSI), the SSB is referred to as a Cell-Defining SSB (CD-SSB). A PCell is associated to a CD-SSB located on the synchronization raster.

Polar coding is used for PBCH. The UE 116 may assume a band-specific sub-carrier spacing for the SSB unless a network has configured the UE 116 to assume a different sub-carrier spacing. PBCH symbols carry its own frequency-multiplexed demodulation reference signal (DMRS). QPSK modulation is used for PBCH.

Four types of link adaptation are supported as follows:

Adaptive transmission bandwidth;

Adaptive transmission duration;

Transmission power control;

Adaptive modulation and channel coding rate.

For channel state estimation purposes, the UE 116 may be configured to transmit SRS that the gNB 102 may use to estimate the uplink channel state and use the estimate in link adaptation.

The gNB 102 determines the desired uplink transmit power and provides uplink transmit power control commands to the UE 116. The UE 116 uses the provided uplink transmit power control commands to adjust its transmit power.

A UE can apply Prioritizations for transmission power reductions.

For single cell operation with two uplink carriers or for operation with carrier aggregation, if a total UE transmit power for PUSCH or PUCCH or PRACH or SRS transmissions on serving cells in a frequency range in a respective transmission occasion i would exceed $\hat{P}_{CMAX}(i)$, where $\hat{P}_{CMAX}(i)$ is the linear value of PCMAX(i) in transmission occasion i as defined in [REF11, TS 38.101-1/2], the UE 116 allocates power to PUSCH/PUCCH/PRACH/SRS transmissions according to the following priority order (in descending order) so that the total UE transmit power for transmissions on serving cells in the frequency range is smaller than or equal to PCMAX(i) for that frequency range in every symbol of transmission occasion i. For the purpose of power allocation in this clause, if a UE is provided uci-MuxWithDiffPrio and the UE 116 multiplexes HARQ-ACK information in a PUSCH, a priority index of the PUSCH is the larger of (a) the priority index of the PUSCH according to clause 9 of [REF3, TS 38.213] and (b) the larger priority index of the HARQ-ACK information. When determining a total transmit power for serving cells in a frequency range in a symbol of transmission occasion i, the UE 116 does not include power for transmissions starting after the symbol of transmission occasion i. The total UE transmit power in a symbol of a slot is defined as the sum of the linear values of UE transmit powers for PUSCH, PUCCH, PRACH, and SRS in the symbol of the slot.

- PRACH transmission on the PCell
- PUCCH or PUSCH transmissions with larger priority index
- For PUCCH or PUSCH transmissions with same priority index
  - PUCCH transmission with HARQ-ACK information, and/or SR, and/or link recovery request (LRR), or PUSCH transmission with HARQ-ACK information of the priority index
  - PUCCH transmission with CSI or PUSCH transmission with CSI
  - PUSCH transmission without HARQ-ACK information of the priority index or CSI and, for Type-2 random access procedure, PUSCH transmission on the PCell
- SRS transmission, with aperiodic SRS having higher priority than semi-persistent and/or periodic SRS, or PRACH transmission on a serving cell other than the PCell In case of same priority order and for operation with carrier aggregation, the UE 116 prioritizes power allocation for transmissions on the primary cell of the MCG or the SCG over transmissions on a secondary cell. In case of same priority order and for operation with two UL carriers, the UE 116 prioritizes power allocation for transmissions on the carrier where the UE 116 is configured to transmit PUCCH. If PUCCH is not configured for any of the two UL carriers, the UE 116 prioritizes power allocation for transmissions on the non-supplementary UL carrier.

Coverage is a fundamental aspect of cellular network deployments. Cellular operators rely on different types of network nodes to offer blanket coverage in their deployments. Deployment of regular full-stack cells, e.g., cells served by a gNB type base stations, usually results in expensive implementation, high cost for equipment, and backhaul connectivity. Their deployment is subjected to a variety of constraints such as expensive site leases. While this is the predominant deployment type encountered in practice, it is not always preferred cost-wise. As a result, other types of network nodes have been regarded to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be regarded as full-stack cells similar to gNBs. The IAB node is a new type of relay node building over the front-haul architecture and constituting a node with a dual role including an IAB Distributed Unit (DU) component making it possible to appear as a regular cell to the UEs which it serves and an IAB Mobile Terminal (MT) component inheriting many properties of a regular UE whereby the IAB node connects to its donor parent node(s) or a gNB. The IAB node is based on a Layer 2 architecture with end-to-end packet data convergence protocol (PDCP) layer from the donor IAB node to the UE 116 for Control Plane (CP) and User Plane (UP). IAB nodes can also be classified as re-generative relays. Every packet traversing the link between the donor node and the IAB-MT component of the IAB node, i.e., the backhaul-link, must be properly decoded and re-encoded by the IAB node for further transmission to the UE 116 on the access link. The first version of IAB in Rel-16 NR assumes half duplex operation in time division multiplexing (TDM) between access and backhaul links for transmission and reception by the IAB node but includes features for forward compatibility towards evolving IAB using full duplex operation. Rel-17

NR further enhances IAB operation with better support of full duplex implementations of IAB nodes.

Another type of network node is the RF repeater which amplifies-and-forwards any signal that it receives. RF repeaters have seen a wide range of deployments in 2G global system for mobile communication (GSM)/(E) general packet radio services (GPRS), 3G wideband code division multiple access (WCDMA)/high speed packet access (HSPA) and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. The main disadvantage is that they amplify both desired signal(s) and (undesired) noise, and hence, often contribute to an increase of interference levels observed at system level. Within RF repeaters, there are different categories depending on the power characteristics and the amount of spectrum that they are configured to amplify, e.g., single band, multi-band, etc. RF repeaters are regarded non-regenerative type of relay nodes. RF repeaters are typically full-duplex nodes and they do not differentiate between UL and DL transmissions or receptions. LTE specifies RF repeater requirements in [TS 36.106]. Their use is limited to LTE frequency division duplexing (FDD) bands.

In Rel-17 NR, RF and EMC requirements in FR1 and FR2 for RF repeaters using NR were introduced. As NR often uses higher frequencies, e.g., 3-4 GHz in FR1 and above 24 GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are TDD. In consequence, simultaneous or bi-directional amplify-and-forward as employed by traditional RF repeaters is not always necessary (unlike in the FDD LTE case) and can therefore be avoided. This much reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater operating in the NR network implies that the prerequisite beamforming gains for NR operation to provide coverage are not available when relaying the NR transmissions and receptions. While a common RF repeater presents a very cost-effective means of extending network coverage, it has limitations when evaluating NR.

Therefore, a new type of network node, bridging the gap between RF repeaters and IAB nodes is a compelling proposition for system deployments to leverage the main advantages of both. That new type of network node, i.e., a smart repeater or network-controlled (NETCON) repeater (NCR) can use side control information (SCI) or NCR control information (NCI) to enable more functionality for an amplify-and-forward operation in a system with TDD access (unpaired spectrum) and multi-beam operation. SCI enables a NCR to perform the amplify-and-forward operation in a more efficient manner. Potential benefits include mitigation of unnecessary noise amplification, transmissions and receptions with improved spatial directivity, and simple network integration. In the control plane (C-plane), a NCR may be provided or configured by the gNB 102 with information on semi-static and/or dynamic downlink/uplink configuration, adaptive transmitter/receiver spatial beamforming, Tx ON/OFF status, and so on. In the user plane (U-plane), the NCR 610 remains non-regenerative, e.g., the NCR 610 employs amplify-and-forward to relay signals to/from UEs from/to the gNB 102. SCI transmission requires low capacity for the control backhaul between the donor cell(s), e.g., gNB and the NCR 610. As a result, the low-complexity and low-cost properties of RF repeaters are mostly preserved while a degree of network configurability and control is enabled similar to eIAB nodes.

Figure 6:
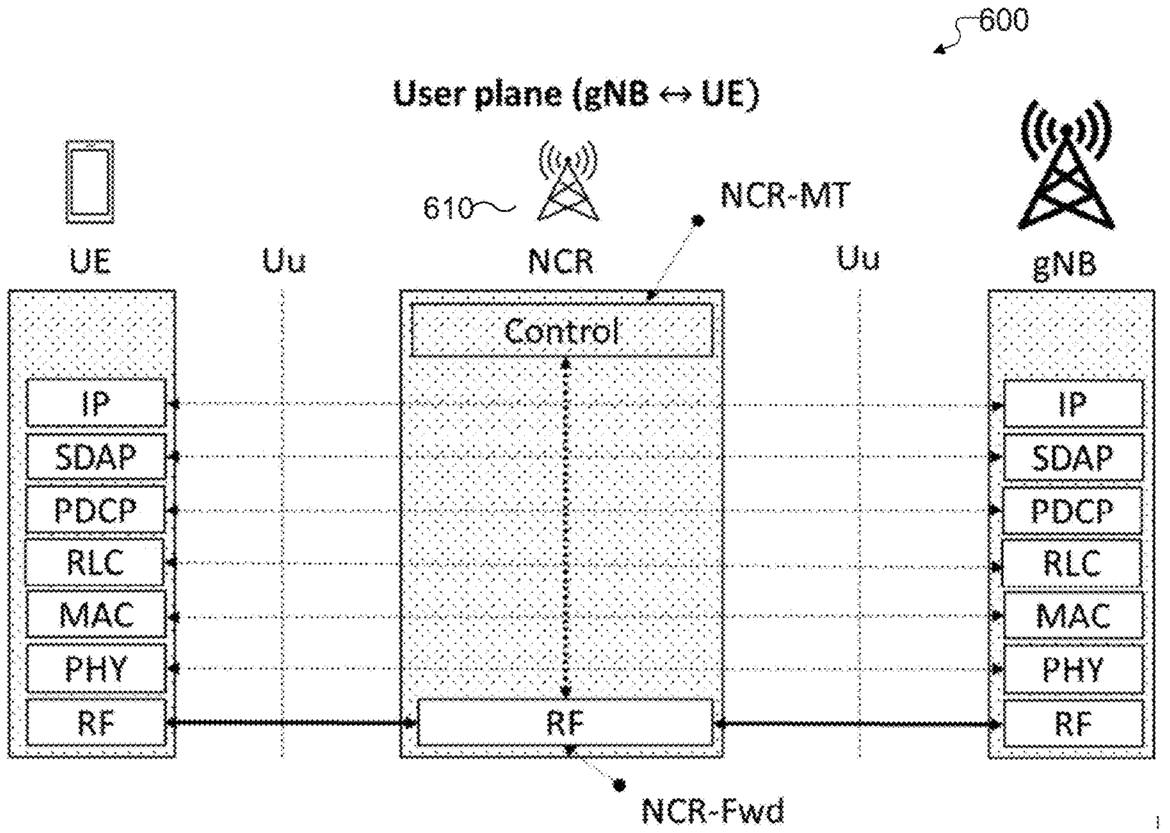
FIG. 6 illustrates a diagram of an example user plane (UP) protocol architecture for a network-controlled-repeater (NCR) according to embodiments of the present disclosure.

FIG. 6 illustrates a diagram 600 of an example UP protocol architecture for a NCR according to embodiments of the present disclosure. For example, diagram 600 of an example UP protocol architecture for a NCR can be utilized between any BS, such as BS 103, and any of the UEs 111-116, such as UE 111, in wireless network 100 of FIG. 1. This example is for illustration only and other embodiments can be used without departing from the scope of the present disclosure.

Figure 7:
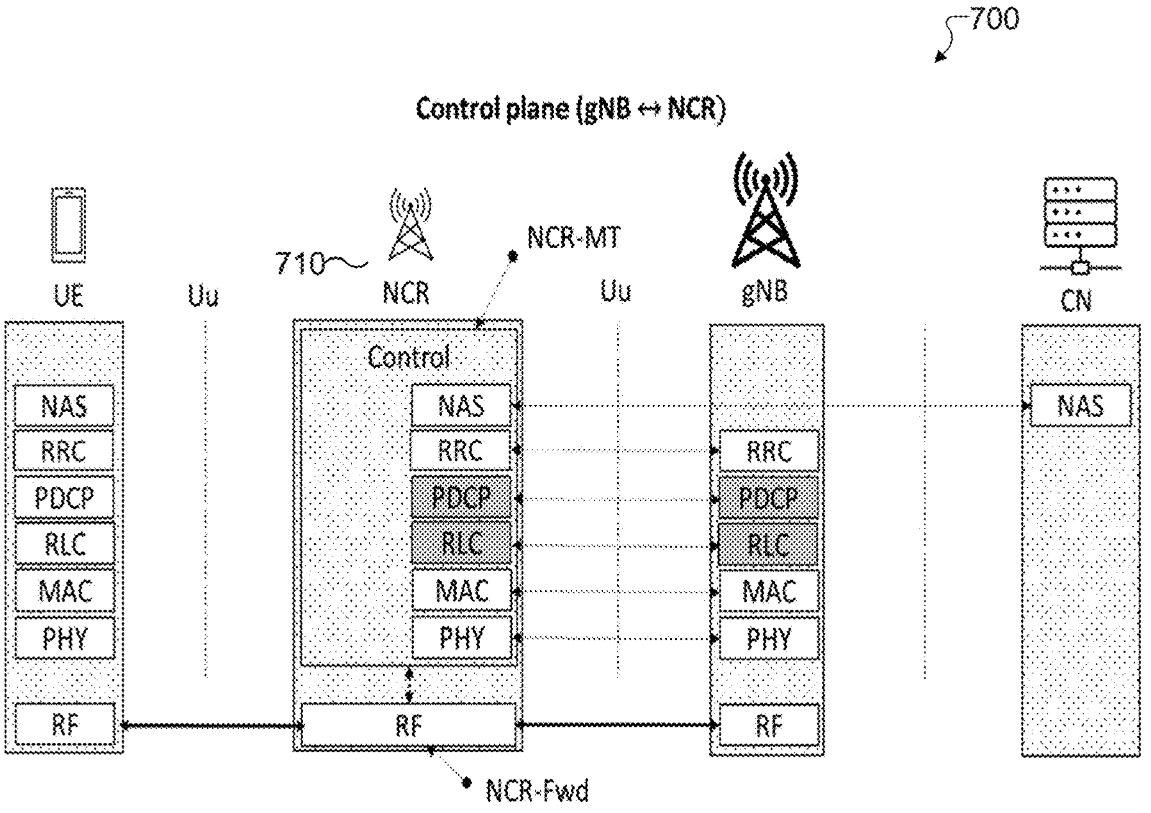
FIG. 7 illustrates a diagram of an example control plane (CP) protocol architecture for a NCR according to embodiments of the present disclosure.

FIG. 7 illustrates a diagram 700 of an example CP protocol architecture for a NCR according to embodiments of the present disclosure. For example, diagram 700 of an example CP protocol architecture for a NCR can be utilized between any BS, such as BS 102, and any of the UEs 111-116, such as UE 116, in wireless network 100 of FIG. 1. This example is for illustration only and other embodiments can be used without departing from the scope of the present disclosure.

Figure 8:
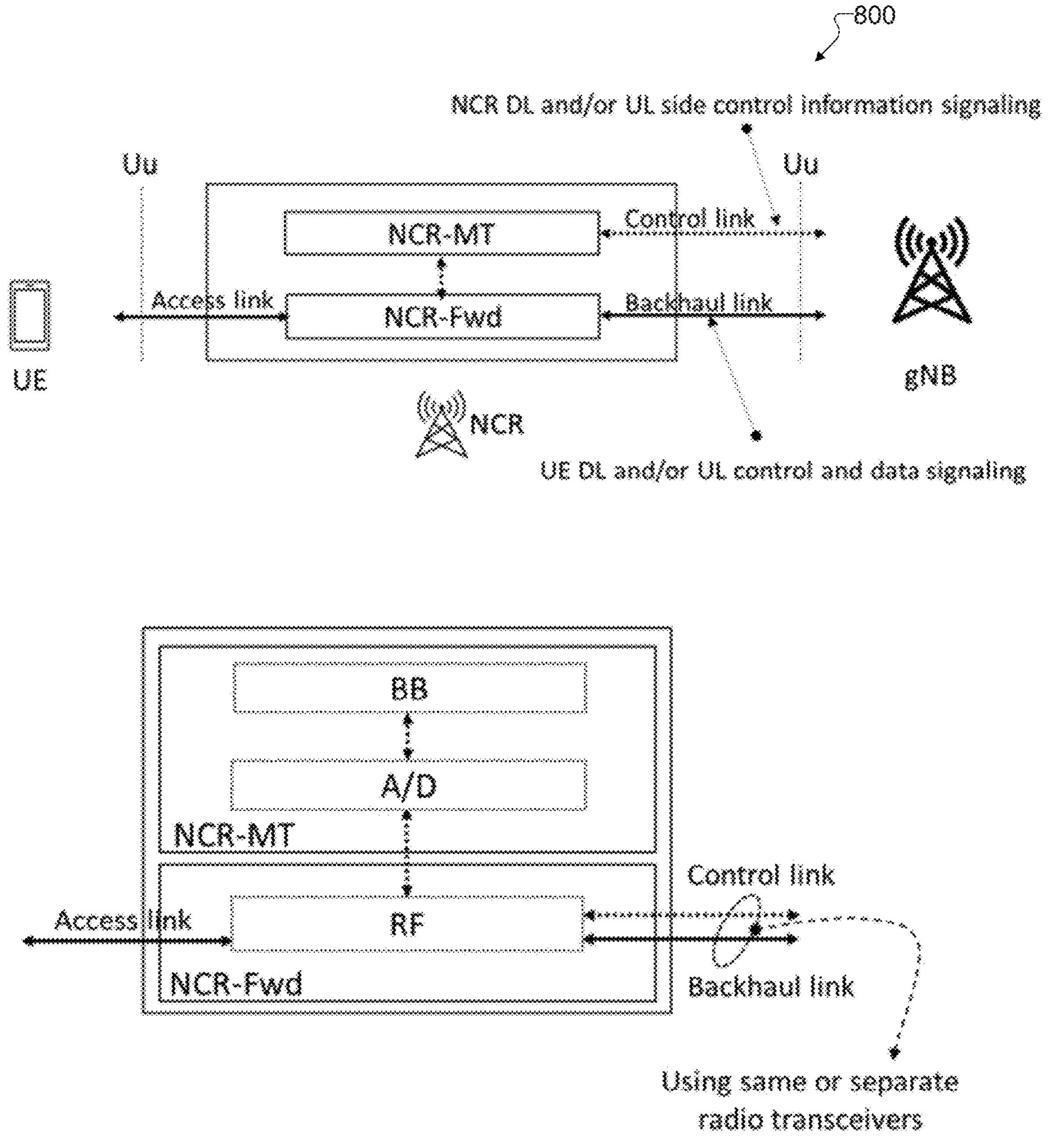
FIG. 8 illustrates a diagram of an example functional architecture for a NCR according to embodiments of the present disclosure.

FIG. 8 illustrates a diagram 800 of an example functional architecture for a NCR according to embodiments of the present disclosure. For example, diagram 800 of an example functional architecture for a NCR can be utilized between the BS 102 and the UE 116 in wireless network 100 of FIG. 1. The NCR includes circuitry, programing, or a combination thereof, to support a prioritization of UL transmissions. This example is for illustration only and other embodiments can be used without departing from the scope of the present disclosure.

Figure 9:
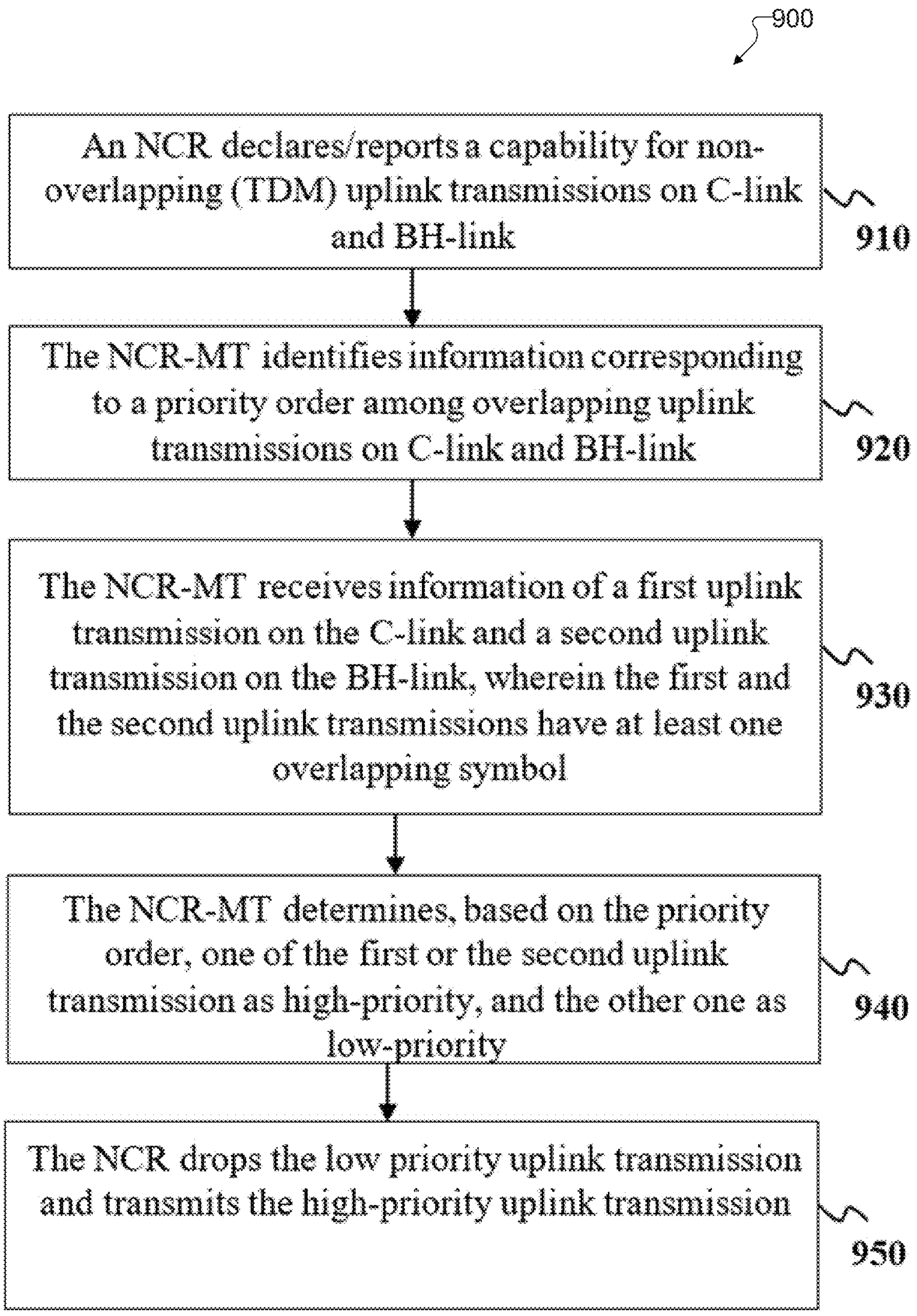
FIG. 9 illustrates a flowchart of an example NCR procedure for dropping behavior according to embodiments of the present disclosure.

FIG. 9 illustrates a flowchart of an example NCR procedure 900 for dropping behavior according to embodiments of the present disclosure. For example, procedure 900 for dropping behavior. For example, procedure 900 can be followed by the NCR 610 of FIG. 6. This example is for illustration only and other embodiments can be used without departing from the scope of the present disclosure.

The procedure begins in 910, a NCR declares/reports a capability for non-overlapping (TDM) uplink transmissions on C-link and BH-link. For example, the capability can be provided in the manufacture declarations and provided to the gNB 102 via OAM, or can be reported to the gNB 102 via RRC signaling. In 920, the NCR-MT identifies information corresponding to a priority order among overlapping uplink transmissions on C-link and BH-link. In 930, the NCR-MT receives information of a first uplink transmission on the C-link and a second uplink transmission on the BH-link, wherein the first and the second uplink transmissions have at least one overlapping symbol. In 940, the NCR-MT determines, based on the priority order, one of the first or the second uplink transmission as high-priority, and the other one as low-priority. In 950, the NCR 610 drops the low priority uplink transmission and transmits the high-priority uplink transmission.

A NCR is modelled and includes a NCR-mobile termination (NCR-MT) entity and an MCR-forward (NCR-Fwd) entity.

The NCR-MT is defined as a functional entity to communicate with a gNB via a Control link (C-link) to enable exchange of control information (e.g., side control information at least for the control of NCR-Fwd). The C-link is based on NR Uu interface.

The NCR-Fwd is defined as a functional entity to perform the amplify-and-forwarding of UL/DL RF signal between gNB and UE via backhaul link and access link. The behavior of the NCR-Fwd will be controlled according to the received side control information from gNB.

With reference to FIGS. 6-8, an example for the functional and protocol architectures of a Smart Repeater/NCR is shown. In the user plane (FIG. 6), the NCR 610 receives the incoming RF signal from the gNB 102 (or the UE 116) at its ingress antenna port, then amplifies-and-forwards the RF signal to its egress antenna port to the UE 116 (or gNB). Note that similar to a common RF repeater, the amplified-and-forwarded signal traverses the RF path, e.g., the signal is processed in analog domain. In the control plane (FIG. 7), e.g., when transmitting DL side control information (DL SCI) from gNB 102 to the NCR 610, or when transmitting UL side control information (UL SCI) from the NCR 610 to the gNB 102, the signal processing by the NCR 610 differs. For transmission of DL SCI, the gNB 102 can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be assumed that the NCR 610 converts part of the incoming (DL) RF signal from the gNB 102 to digital domain to determine presence and further process the received signaling contents of DL SCI. For transmission of UL SCI to the gNB 102, it may be assumed that the NCR 610 receives the incoming RF signal from the UE 116 at its ingress antenna port and then amplifies-and-forwards the RF signal while adding the UL SCI following its conversion from digital signaling processing to analog domain for transmission at the egress antenna port (FIG. 9). For transmission of UL SCI, the NCR 610 can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the NCR 610 may also be configured or provisioned or receive or transmit signaling messages using non-access stratum (NAS) protocol messages, such as CM, SM, and so on, and/or by operation and maintenance (O&M) signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

Throughout the present disclosure a NCR-MT may also be referred to as SR-MT, a NCR-Fwd may also be referred to as SR-radio unit (RU) or NCR-RU, a NCR backhaul link or a NCR control-link (C-link) may also be referred to as NCR-to-gNB link (or gNB-to-NCR link), and the NCR 610 access link may also be referred to as NCR-to-UE(s) link (or UE(s)-to-NCR link).

In some realizations, at least one of the NCR-MT's carrier(s) operates in the frequency band forwarded by the NCR-Fwd. NCR-MT and NCR-Fwd operating in a same frequency band is used as reference for the descriptions in the disclosure. In general, a NCR-Fwd may operate with multiple passbands/carriers in same or different frequency band and a corresponding NCR-MT may operate in one or more passbands/carriers from the multiple passbands/carriers for NCR-Fwd operation in one or more frequency bands. In one example, the NCR-MT may additionally or alternatively operate in carrier(s) outside the frequency bands in which NCR-Fwd operates. Herein, a passband can refer to a frequency range in which a repeater/NCR_Fwd operates in with operational configuration. Such frequency range can correspond to one or several consecutive nominal channels. When an operating frequency for a NCR-Fwd is not consecutive, each subset of channels may be regarded as an individual passband. A NCR-Fwd can have one or several passbands.

In some realizations, same large-scale properties of the channel, i.e., channel properties in Type-A and Type-D (if applicable) QCL, can be experienced by C-link and backhaul link (at least when the NCR-MT and NCR-Fwd are operating in a same frequency band).

For the transmission/reception of C-link and backhaul link by NCR:

- Signalling on the DL of C-link and DL of backhaul link can be performed simultaneously or in a TDM manner.
- Signalling on the UL of C-link and UL of backhaul link can be performed in a TDM manner.

The multiplexing can be under the control of gNB with evaluation for NCR capability and simultaneous transmission of the UL of C-link and UL of backhaul link can be also subject to NCR capability.

The term 'beam' is used to refer to a spatial filter for transmission or reception of a signal or a channel, for example by the NCR-Fwd. For example, a beam (of an antenna) can be a main lobe of the radiation pattern of an antenna array, or a sub-array or an antenna panel, or of multiple antenna arrays, sub-arrays or panels combined, that are used for such transmission or reception.

Various embodiments, methods, and examples described in the present disclosure can apply beyond NCR/smart repeaters nodes to other nodes with a repeater/relay-like functionality in a wireless network, such as reconfigurable intelligent surfaces (RIS), or to stationary or non-stationary repeater/relay-like nodes in the sky/sea or other not-on-the-ground situations, for example, satellites in non-terrestrial networks (NTN), or mobile repeaters on buses/trains/vessels/ships/aircrafts/drones, and so on.

Throughout the present disclosure, a gNB-to-NCR link (or NCR-to-gNB link) is used to refer to one or both of a NCR control link (C-link) or a NCR backhaul link. Throughout the present disclosure, a NCR-to-UE link (or UE-to-NCR link) is used to refer to a NCR access link.

When a NCR node is deployed in a wireless communication system, the NCR 610 needs to first establish its identity and capabilities for operation in the system. For example, the NCR 610 needs to be identified and/or authenticated by the radio access network (RAN), including one or more gNB(s), or the Core Network (CN). For example, the NCR 610 needs to indicate capabilities of the corresponding NCR-MT or NCR-Fwd to the gNB 102. For example, the NCR 610 uses RRC signaling for exchange of capabilities for NCR-MT and uses OAM signaling or configuration for exchange of capabilities for NCR-Fwd. For example, NCR-Fwd capabilities can be based on those provided in the NCR 610 manufacturer's declarations.

In one example, when an architecture of a NCR-MT supports limited protocols compared to a UE, such as support only for physical (PHY) or medium access control (MAC) layers, the NCR-MT can perform initial/random access, for example, for the purpose of establishing beam, timing, or identification, without establishing an RRC connection (over the air). In one example, the NCR 610 does not support any RRC protocol procedures/signaling. In another example, the NCR 610 supports a simplified RRC configuration, such as one with a limited set of IEs, that are provided to the NCR-MT using PHY or MAC signaling or using SIB messages. For example, the simplified RRC configuration can be based on cell-specific reference signals such as SSBs, without any NCR-specific reference signals such as CSI-RS or SRS. In yet another example, the NCR-MT is provided pre-configuration for higher layers, such as for RRC layer/protocol or via operation and management (OAM) signaling, for example, at the time of deployment, instead of establishing the RRC connection over the air.

In one example, an architecture for the NCR-MT includes a full protocol stack, including RRC configuration/signaling. In this case, once NCR-MT establishes an RRC connection/configuration, the NCR-MT can exchange RRC messages with the gNB 102 for the purpose of identification.

When a NCR does not support simultaneous/time overlapping uplink transmissions on the C-link and backhaul link (BH-link), in a first option, the NCR 610 does not expect to be provided configuration or scheduling information for overlapping uplink transmissions on the C-link and the BH-link. In a second option, the NCR 610 may be provided configuration or scheduling information for overlapping uplink transmissions on the C-link and the BH-link. The NCR 610 determines, based on priority rules, to transmit on the uplink (to the gNB 102) on only one of the C-link or the BH-link and drops the uplink transmission on the other link.

According to the first option, it is up to the gNB 102 implementation to ensure the NCR 610 is not provided overlapping uplink transmissions on the C-link and the BH-link. For example, the NCR 610 does not expect to receive (that is, the gNB 102 does not provide) both:

- configuration or scheduling information for a first uplink transmission, by the NCR-MT, on the C-link in a symbol or slot, and
- beam indication for NCR-Fwd access link for a time domain resource that includes the symbol or slot when the symbol or slot is configured or indicated to be an uplink symbol or slot.

Herein, the first uplink transmission can include, for example, periodic PUCCH or periodic SRS or configured grant PUSCH (CG-PUSCH) Type-1 that is configured by higher layers, or can be a PUSCH or CG-PUSCH Type-2 or PUCCH or aperiodic SRS that is scheduled/triggered by a DCI format, or can be a semi-persistent (SP) PUCCH or SP SRS that is activated by a MAC-CE. For example, the first uplink transmission can include a PRACH transmission triggered by a PDCCH order or by NCR higher layers such as for expiry of uplink TA timer or for BFR or for connection re-establishment.

Herein, the NCR-MT determines that the symbol or slot is an uplink symbol or slot based on a cell-specific TDD configuration or based on a dedicated or NCR-specific TDD configuration or based on a slot format indication (SFI) for NCR-MT such as an SFI provided by a DCI format 2_0 or side control information for NCR-Fwd that provides dynamic UL or DL link directions for the symbol or slot. The latter side control information can be provided separately from or jointly with the beam indication for NCR-Fwd access link that is provided for the time domain resource.

Herein, the beam indication for the NCR-Fwd access link can include, for example, any of periodic or semi-persistent or aperiodic beam indication methods.

For example, when an internal delay of the NCR-Fwd is small/negligible, such as smaller than a symbol or smaller than a CP in a symbol or smaller than a predetermined/preconfigured threshold, a beam indication for the NCR-Fwd access link implies a second uplink transmission on the BH-link in the same symbol or slot.

For example, when an internal delay of the NCR-Fwd is large, such as larger than a symbol or larger than a CP of a symbol or larger than a predetermined/preconfigured threshold, a beam indication for NCR-Fwd access link for a time domain resource implies a second uplink transmission on the BH-link in the symbol or slot, when the time domain resource after applying an offset equal to the internal delay of the NCR-Fwd includes the symbol or slot.

In general, regardless of a NCR-Fwd internal delay value, a NCR-Fwd can advance by a NCR-specific delay a time for receptions on the access link relative to a time for transmissions on the backhaul link.

In various realizations, dropping an uplink transmission can refer to dropping the uplink transmission in only one or multiple symbols or one or multiple slots, such as the symbols/slots that overlap with other uplink transmissions and/or the symbols/slots where a corresponding power limit is exceeded, or can refer to dropping the uplink transmission entirely, including symbols/slots without overlap with other uplink transmissions or symbols/slots without any power limit being exceeded.

According to the second option, the NCR 610 may receive (that is, the gNB 102 may provide) both:

- configuration or scheduling information for a first uplink transmission, by the NCR-MT, on the C-link in a symbol or slot, and
- beam indication for NCR-Fwd access link for a time domain resource that includes the symbol or slot when the symbol or slot is configured or indicated to be an uplink symbol or slot. Such beam indication implies a second uplink transmission on the BH-link in the symbol or slot.

Then, the NCR 610 applies prioritization rules to select one of the first or the second uplink transmissions to be dropped and the NCR 610 only performs the other/non-dropped uplink transmission.

For example, one or more of the following prioritization rules can be predetermined in the specifications of the system operation or (pre)configured by OAM or provided by higher layer signaling such as SIB or common or dedicated RRC information or signaling.

For example, prioritization rule for the C-link can be based on an uplink channel or signal that is to be transmitted on the C-link.

For example, prioritization rule for the BH-link can be based on a priority flag or a beam indication type provided for a corresponding uplink transmission on the access link in a corresponding time domain resource. If the priority flag indicates low/high priority for a time domain resource or a list of time domain resources in the access link, uplink transmissions on the BH-link for the corresponding time domain resources are low/high priority. If the priority flag is present, such as with a value "true", for a time domain resource or a list of time domain resources in the access link, uplink transmissions on the BH-link for the corresponding time domain resources are high priority. If the priority flag is absent, such as no value "true" or no value present or with a value "false" provided, for a time domain resource or a list of time domain resources in the access link, uplink transmissions on the BH-link for the corresponding time domain resources are low priority.

In a first example, the BH-link is prioritized over the C-link, regardless of a signal or channel for the first uplink transmission or a priority flag/order for the second uplink transmission. Such behavior can be beneficial, for example, to ensure UE transmissions are forwarded to the gNB 102 without any dropping or disruption.

In a second example, the C-link is prioritized over the BH-link, regardless of a signal or channel for the first uplink transmission or a priority flag/order for the second uplink transmission. Such behavior can be beneficial, for example, to ensure uplink transmissions from the NCR-MT, that are typically infrequent and for control purposes, can be received by the gNB 102 without being dropped.

In a third example, a prioritization between the C-link and the BH-link is also based on a signal or channel for the first uplink transmission or based on a priority flag/order for the second uplink transmission. Several realizations can be evaluated.

Figure 10:
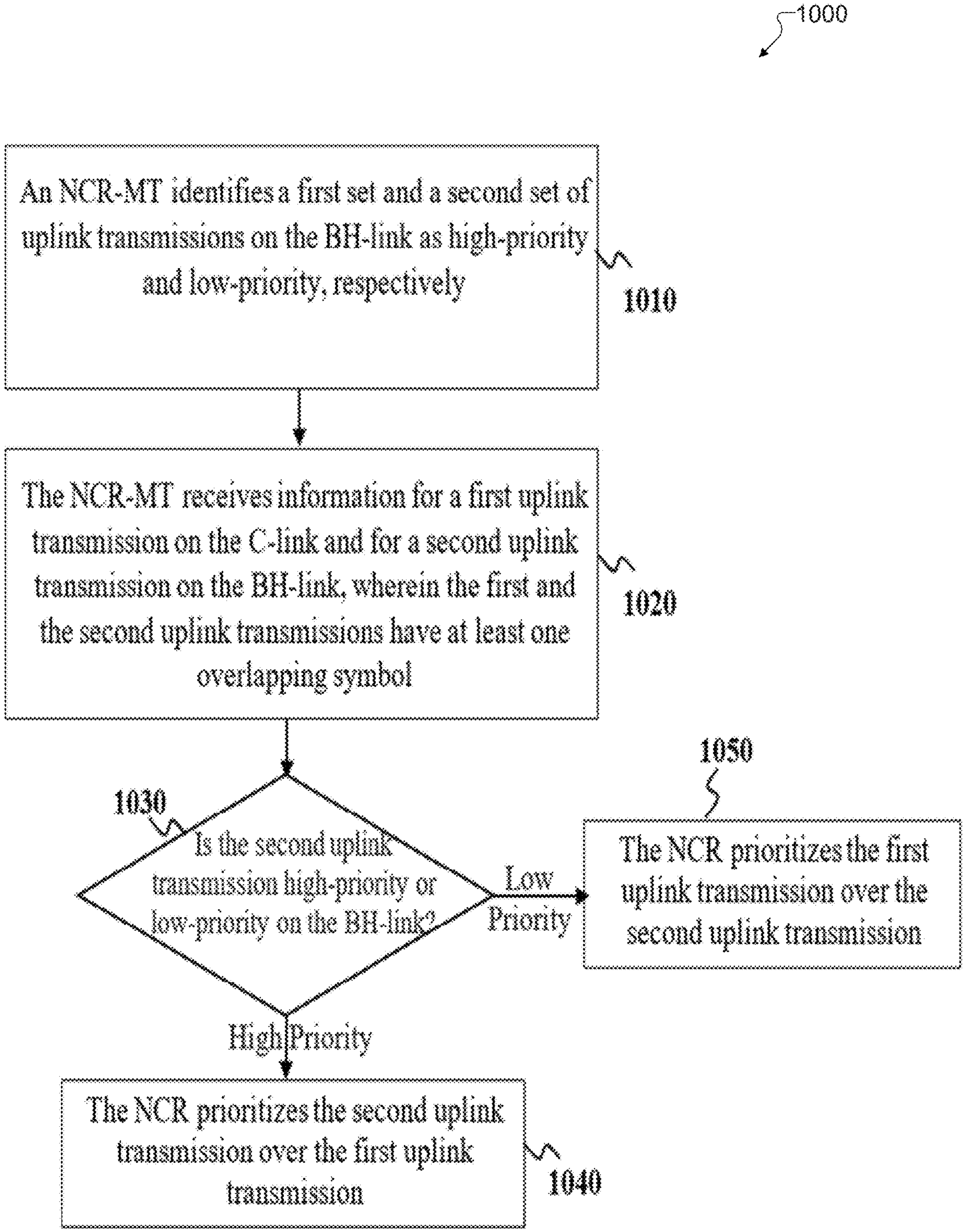
FIG. 10 illustrates a flowchart of an example NCR procedure for prioritization of overlapping UL transmissions according to embodiments of the present disclosure.

FIG. 10 illustrates a flowchart of an example NCR procedure 1000 for prioritization of overlapping UL transmissions according to embodiments of the present disclosure. For example, NCR procedure 1000 for prioritization of overlapping UL transmissions can be performed by the NCR 710 of FIG. 7. This example is for illustration only and other embodiments can be used without departing from the scope of the present disclosure.

The procedure begins in 1010, a NCR-MT identifies a first set and a second set of uplink transmissions on the C-link as high-priority and low-priority uplink transmissions on the C-link, respectively. In 1020, the NCR-MT receives information for a first uplink transmission on the C-link and for a second uplink transmission on the backhaul link (BH-link), wherein the first and the second uplink transmissions have at least one overlapping symbol. In 1030, the NCR-MT determines whether the first uplink transmission is high-priority or low-priority on the C-link based on whether the first uplink transmission belongs to the first or the second set of uplink transmissions. In 1040, in response to the first uplink transmission being high-priority on the C-link, the NCR 610 prioritizes the first uplink transmission over the second uplink transmission. In 1050, in response to the first uplink transmission being low-priority on the C-link, the NCR 610 prioritizes the second uplink transmission over the first uplink transmission.

Figure 11:
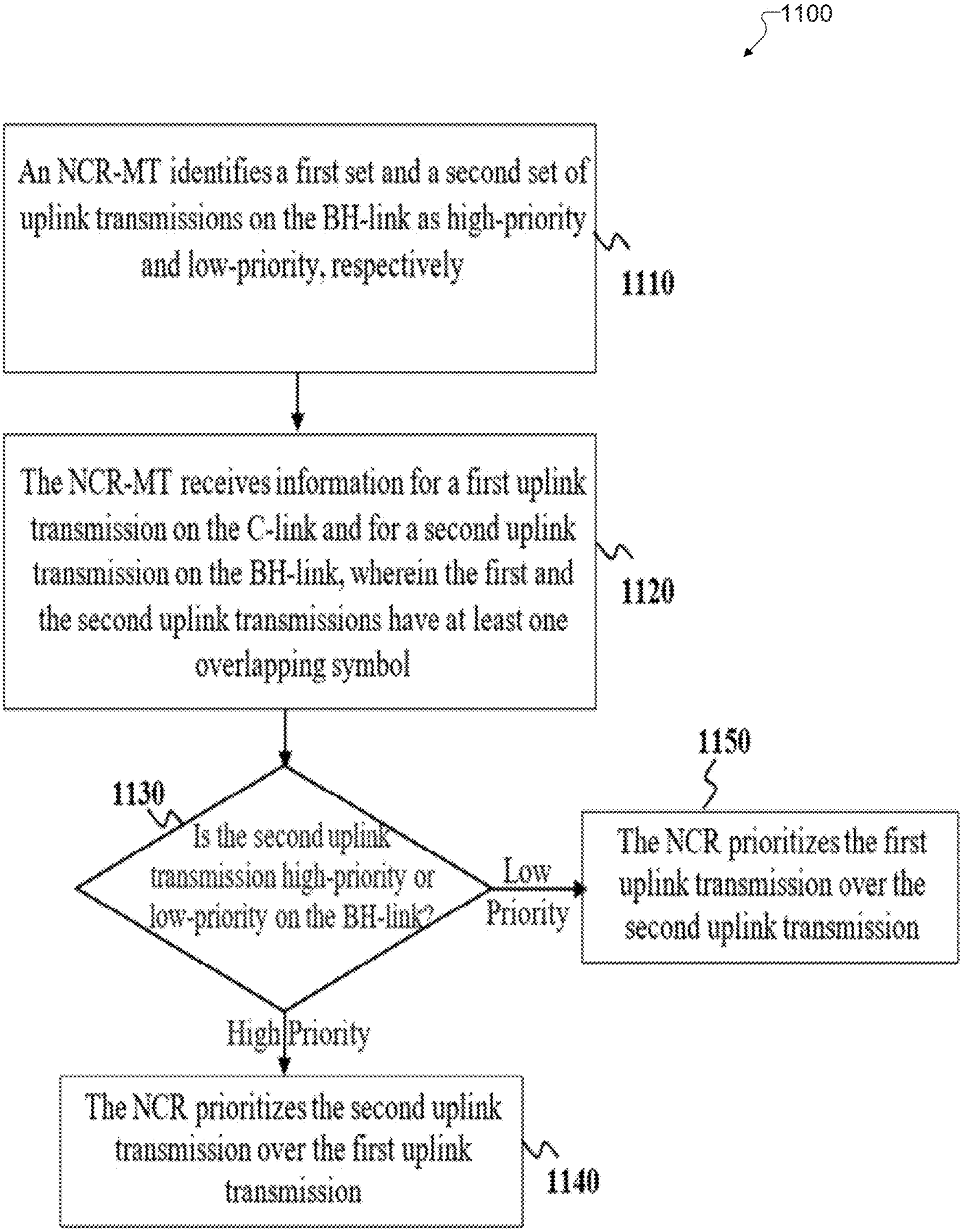
FIG. 11 illustrates a flowchart of an example NCR procedure for prioritization of overlapping UL transmissions according to embodiments of the present disclosure.

In a first realization, uplink transmissions on the C-link are categorized into low-priority and high-priority transmissions, while no prioritization is evaluated for uplink transmissions on the BH-link. Accordingly, overlapping uplink transmissions on the C-link and BH-link are prioritized in the following order:

first, high-priority uplink transmissions on the C-link
second, uplink transmissions on the BH-link
third, low-priority uplink transmissions on the C-link FIG. 11 illustrates a flowchart of an example NCR procedure 1100 for prioritization of overlapping UL transmissions according to embodiments of the present disclosure. For example, procedure 1100 for prioritization of overlapping UL transmissions can be performed by the NCR 610 of FIG. 6 in wireless network 100 of FIG. 1. This example is for illustration only and other embodiments can be used without departing from the scope of the present disclosure.

The procedure begins in 1110, a NCR-MT identifies a first set and a second set of uplink transmissions on the BH-link as high-priority and low-priority uplink transmissions on the BH-link, respectively. In 1120, the NCR-MT receives information for a first uplink transmission on the C-link and for a second uplink transmission on the backhaul link (BH-link), wherein the first and the second uplink transmissions have at least one overlapping symbol. In 1130, the NCR-MT determines whether the first uplink transmission is high-priority or low-priority on the BH-link based on whether the first uplink transmission belongs to the first or the second set of uplink transmissions. In 1140, in response to the first uplink transmission being high-priority on the BH-link, the NCR 610 prioritizes the first uplink transmission over the second uplink transmission. In 1150, in response to the first uplink transmission being low-priority on the C-link, the NCR 610 prioritizes the second uplink transmission over the first uplink transmission.

Figure 12:
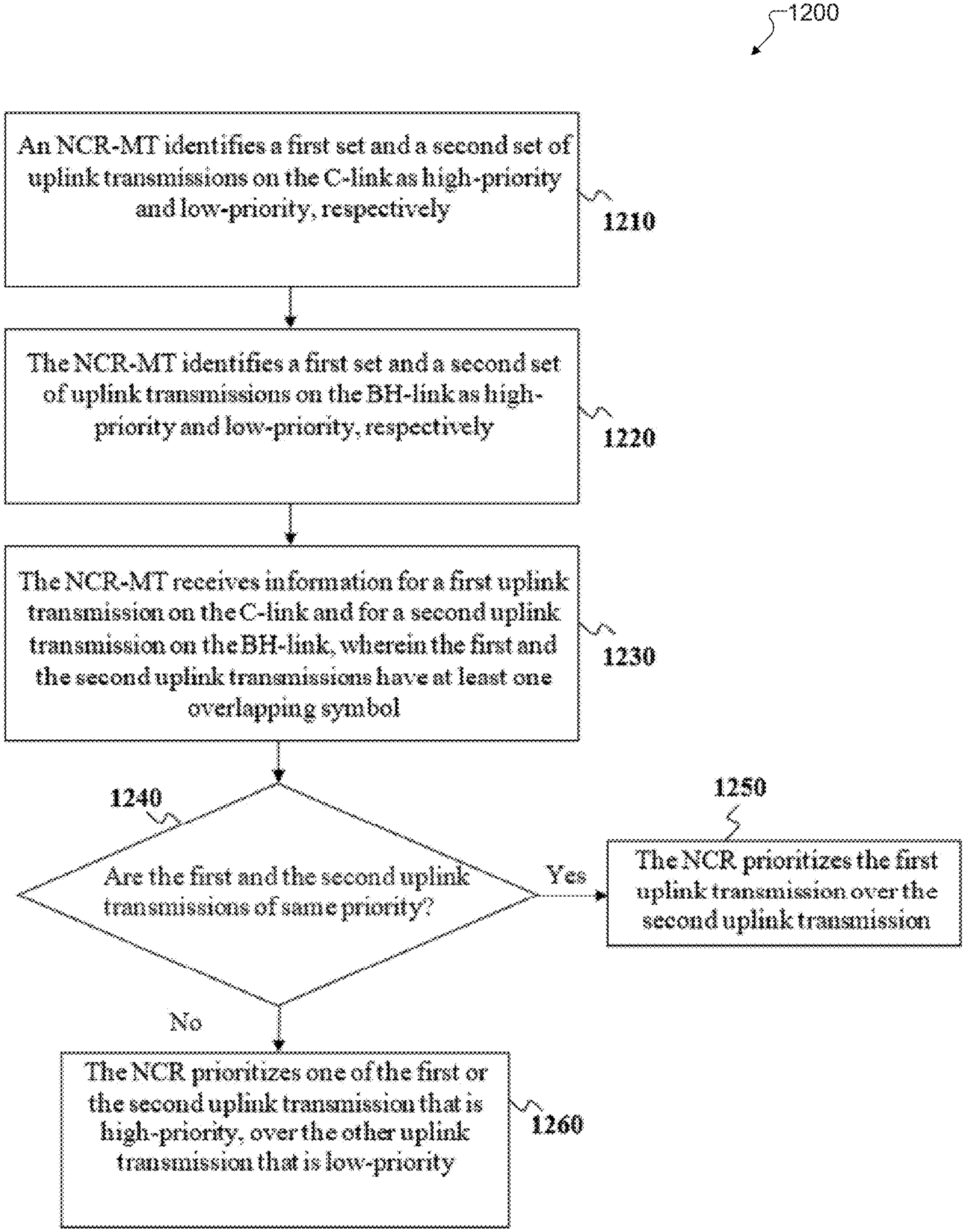
FIG. 12 illustrates a flowchart of an example NCR procedure for prioritization of overlapping UL transmissions according to embodiments of the present disclosure.

In a second realization, uplink transmissions on the BH-link are categorized into low-priority and high-priority transmissions, while no prioritization is evaluated for uplink transmissions on the C-link. For example, the categorization of BH-link transmissions can be based on a priority flag provided by higher layers or a beam indication type for corresponding transmission/time domain resource on the access link. Accordingly, overlapping uplink transmissions on the C-link and BH-link are prioritized in the following order:

first, high-priority uplink transmissions on the BH-link
second, uplink transmissions on the C-link
third, low-priority uplink transmissions on the BH-link FIG. 12 illustrates a flowchart of an example NCR procedure 1200 for prioritization of overlapping UL transmissions according to embodiments of the present disclosure. For example, procedure 1200 for prioritization of overlapping UL transmissions can be performed by the NCR 610 of FIG. 6 in wireless network 100 of FIG. 1. This example is for illustration only and other embodiments can be used without departing from the scope of the present disclosure.

The procedure begins in 1210, a NCR-MT identifies a first set and a second set of uplink transmissions on the C-link as high-priority and low-priority uplink transmissions on the C-link, respectively. In 1220, the NCR-MT identifies a first set and a second set of uplink transmissions on the BH-link as high-priority and low-priority uplink transmissions on the BH-link, respectively. In 1230, the NCR-MT receives information for a first uplink transmission on the C-link and for a second uplink transmission on the BH-link, wherein the first and the second uplink transmissions have at least one overlapping symbol. In 1240, the NCR-MT determines whether the first and the second uplink transmissions have same priority or different priorities. In 1250, in response to the first and the second uplink transmissions having same priority, the NCR 610 prioritizes the first uplink transmission over the second uplink transmission. In 1260, in response to the first and the second uplink transmissions having different priorities, the NCR 610 prioritizes one of the first or the second uplink transmission that has high priority for the respective link, over the other uplink transmission that has low priority for the respective link.

In a third realization, uplink transmissions on both the BH-link and the C-link are categorized into low-priority and high-priority transmissions, wherein a high-priority uplink transmission is prioritized over a low-priority uplink transmission regardless of a respective link, and for uplink transmissions, in a same prioritization category, an uplink transmission on the BH-link is prioritized over an uplink transmission on the C-link. Accordingly, overlapping uplink transmissions on the C-link and BH-link are prioritized in the following order:

first, high-priority uplink transmissions on the BH-link
second, high-priority uplink transmission on the C-link
third, low-priority uplink transmissions on the BH-link
fourth, low-priority uplink transmissions on the C-link In a fourth realization, uplink transmissions on both the BH-link and the C-link are categorized into low-priority and high-priority transmissions, wherein a high-priority uplink transmission is prioritized over a low-priority uplink transmission regardless of a respective link and for uplink transmissions, in a same prioritization category, an uplink transmission on the C-link is prioritized over an uplink transmission on the BH-link. Accordingly, overlapping uplink transmissions on the C-link and BH-link are prioritized in the following order:

first, high-priority uplink transmissions on the C-link
second, high-priority uplink transmission on the BH-link
third, low-priority uplink transmissions on the C-link
fourth, low-priority uplink transmissions on the BH-link FIG. 12 can also apply to the fourth realization described above, wherein BH-link is prioritized over C-link in case of same priority level between C-link and BH-link, by modifying step 1250 as follows: "In response to the first and the second uplink transmissions having same priority, the NCR prioritizes the second uplink transmission over the first uplink transmission."

In the above examples and realizations, a set of low-priority or high-priority uplink transmissions for the C-link or BH-link can be predetermined in the specifications of the system operations or can be (pre)configured by OAM, or by a SIB, or by common or dedicated RRC information or signaling. Several examples are evaluated in the following.

Figure 13:
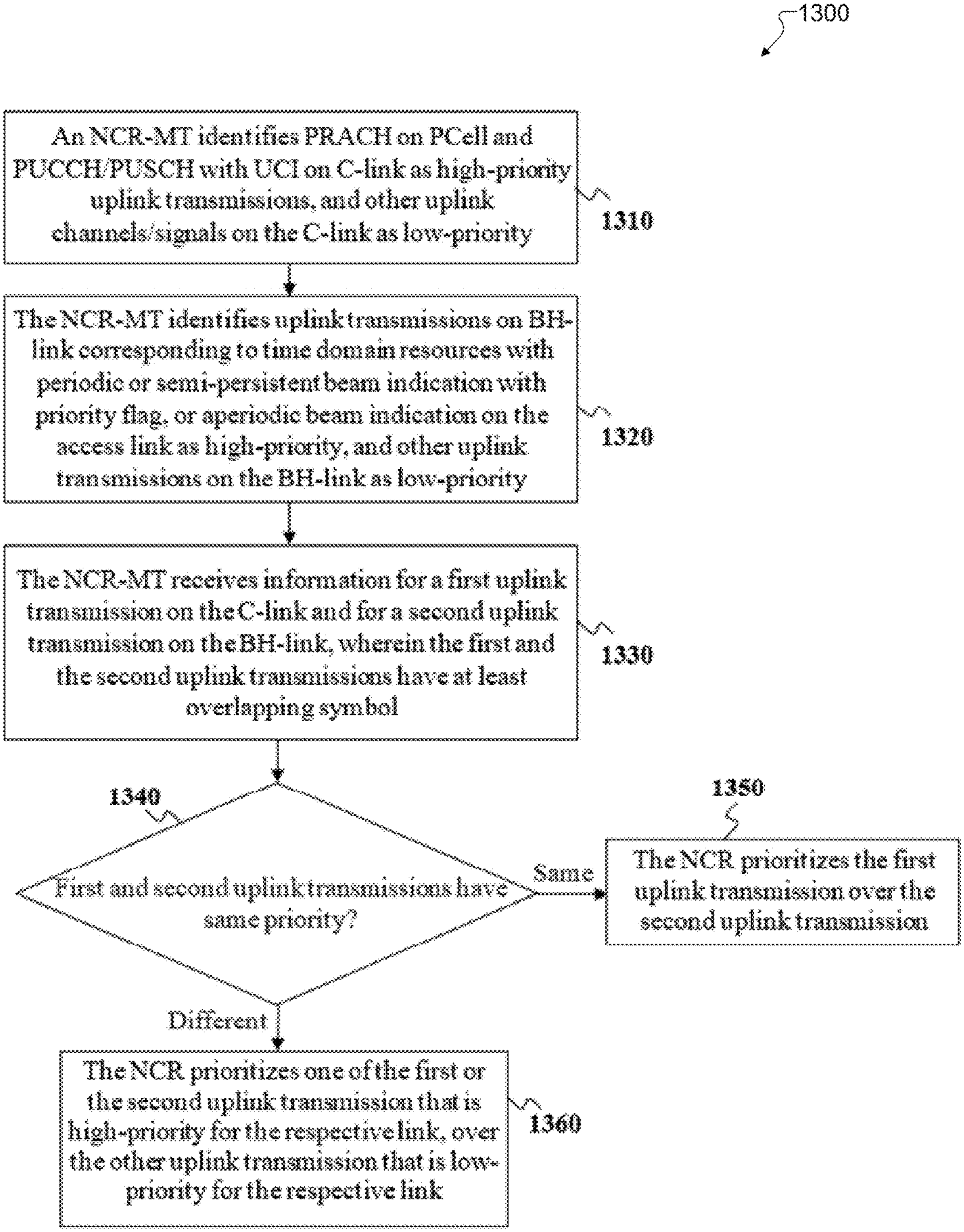
FIG. 13 illustrates a flowchart of an example NCR procedure for prioritization of overlapping UL transmissions according to embodiments of the present disclosure.

FIG. 13 illustrates a flowchart of an example NCR procedure 1300 for prioritization of overlapping UL transmissions according to embodiments of the present disclosure. For example, procedure 1300 for prioritization of overlapping UL transmissions can be performed by the NCR 610 of FIG. 6. This example is for illustration only and other embodiments can be used without departing from the scope of the present disclosure.

The procedure begins in 1310, a NCR-MT identifies PRACH on PCell and PUCCH/PUSCH with UCI on C-link as high-priority uplink transmissions, and other uplink channels/signals on the C-link as low-priority. In 1320, the NCR-MT identifies uplink transmissions on BH-link corresponding to time domain resources with periodic or semi-persistent beam indication with priority flag, or aperiodic beam indication on the access link as high-priority, and other uplink transmissions on the BH-link as low-priority. In 1330, the NCR-MT receives information of a first uplink transmission on the C-link and a second uplink transmission on the BH-link, wherein the first and the second uplink transmissions have at least one overlapping symbol. In 1340, the NCR-MT determines whether or not the first and the second uplink transmissions have same priority. In 1350, in response to the first and the second uplink transmissions having same priority, the NCR 610 prioritizes the first uplink transmission over the second uplink transmission. In 1360, in response to the first and the second uplink transmissions having different priorities, the NCR 610 prioritizes one of the first or the second uplink transmission that is high-priority for the respective link, over the other uplink transmission that is low-priority for the respective link.

Figure 14:
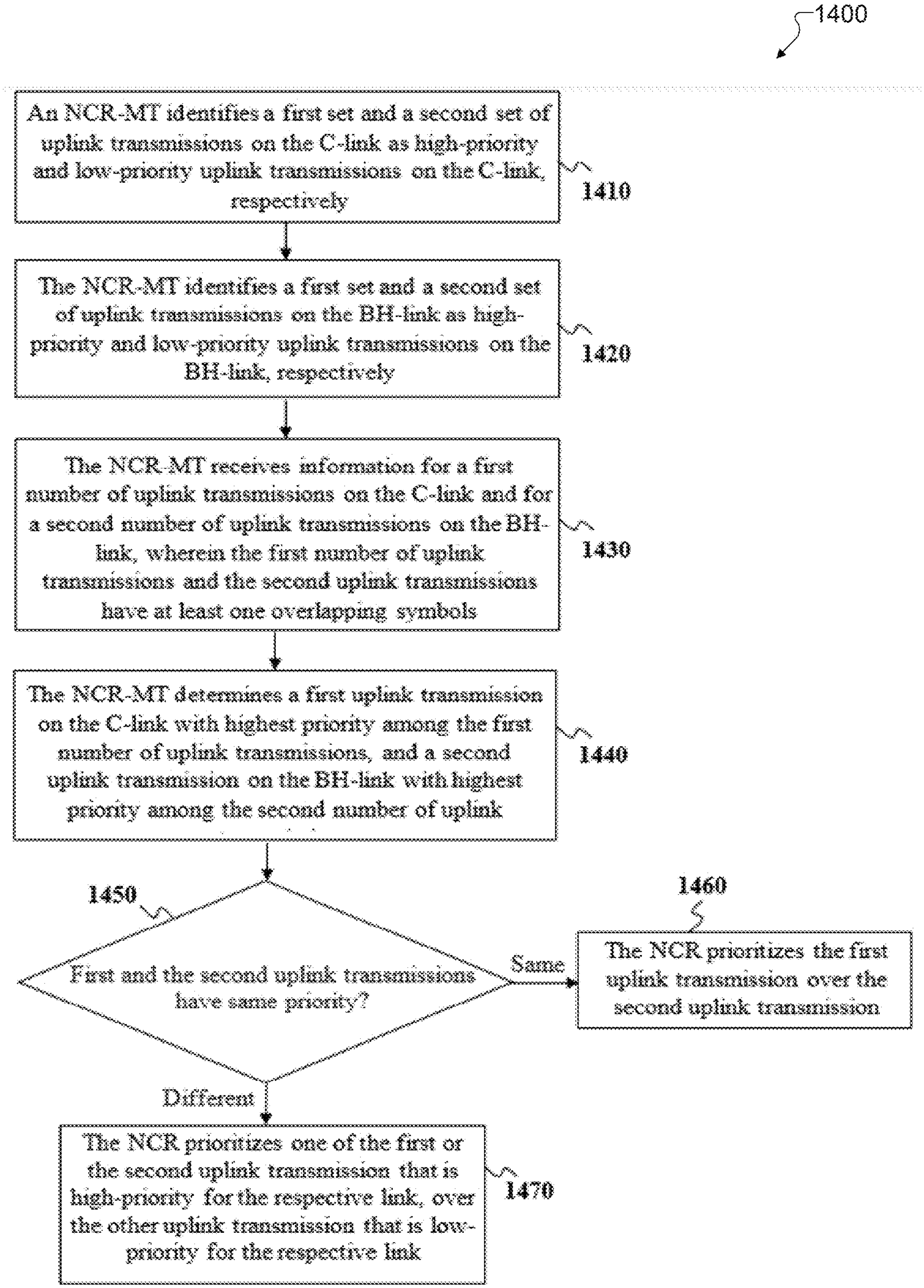
FIG. 14 illustrates a flowchart of an example NCR procedure for prioritization of transmissions according to embodiments of the present disclosure.

FIG. 14 illustrates a flowchart of an example NCR procedure 1400 for prioritization of transmissions according to embodiments of the present disclosure. For example, procedure 1400 for prioritization of transmissions can be followed by the NCR 710 of FIG. 7. This example is for illustration only and other embodiments can be used without departing from the scope of the present disclosure.

The procedure begins in 1410, a NCR-MT identifies a first set and a second set of uplink transmissions on the C-link as high-priority and low-priority uplink transmissions on the C-link, respectively. In 1420, the NCR-MT identifies a first set and a second set of uplink transmissions on the BH-link as high-priority and low-priority, respectively. In 1430, the NCR-MT receives information of a first number of uplink transmissions on the C-link and a second number of uplink transmissions on the BH-link, wherein the first number of uplink transmissions and the second uplink transmissions have at least one overlapping symbol. In 1440, the NCR-MT determines a first uplink transmission on the C-link with highest priority among the first number of uplink transmissions, and a second uplink transmission on the BH-link with highest priority among the second number of uplink transmissions. In 1450, the NCR-MT determines whether or not the first and the second uplink transmissions have same priority. In 1460, in response to the first and the second uplink transmissions having same priority, the NCR 610 prioritizes the first uplink transmission over the second uplink transmission. In 1470, in response to the first and the second uplink transmissions having different priority, the NCR 610 prioritizes one of the first or the second uplink transmission that is high-priority for the respective link, over the other uplink transmission that is low-priority for the respective link.

For example, a priority level can be evaluated among different uplink signals or channels for transmissions on the C-link. For example, some uplink signals or channels on the C-link can be evaluated as high-priority for the C-link, while other uplink signals or channels on the C-link can be evaluated as low-priority for the BH-link. For example, the prioritization of uplink transmissions on the C-link can be based on the following ordering:

- PRACH transmission on the PCell
- PUCCH or PUSCH transmissions with larger priority index
- For PUCCH or PUSCH transmissions with same priority index:
  - PUCCH transmission with HARQ-ACK information, and/or scheduling request (SR), and/or link recovery request (LRR), or PUSCH transmission with HARQ-ACK information of the priority index
  - PUCCH transmission with CSI or PUSCH transmission with CSI
  - PUSCH transmission without HARQ-ACK information of the priority index or CSI and, for Type-2 random access procedure, PUSCH transmission on the PCell
- SRS transmission, with aperiodic SRS having higher priority than semi-persistent and/or periodic SRS, or PRACH transmission on a serving cell other than the PCell.

For example, a first set of uplink transmissions from the list herein of ordering can be evaluated as high-priority, and a second set/remaining of uplink transmissions from the list herein of ordering can be evaluated as low-priority for the C-link. For example, the first and second sets are mutually exclusive and their union includes all the uplink transmissions on the C-link.

For example, PRACH transmission (on the PCell) on the C-link is evaluated as a high-priority transmission for the C-link, and any other uplink transmission on the C-link is evaluated as a low-priority. Such behavior can be beneficial, for example, to prioritize C-link only for the case of PRACH transmission, such as for re-establishing UL timing alignment. Otherwise, BH-link is prioritized.

For example, PRACH transmission (on the PCell) and any PUCCH or PUCCH transmission with uplink control information (UCI) on the C-link is evaluated as a high-priority and any other uplink transmission on the C-link, including PUSCH without UCI, SRS, (and PRACH on any cell other than PCell), is evaluated as a low-priority. Herein, UCI can refer to one or more of, for example, HARQ-ACK information, SR, LRR, and CSI. Such behavior can be beneficial, for example, to prioritize C-link only for the case of PRACH transmission or for certain/all UCI transmission for controlling NCR-MT, otherwise BH-link is prioritized.

For example, PRACH transmission (on the PCell) and PUCCH/PUCCH transmission with HARQ-ACK information on the C-link is evaluated as a high-priority, and any other uplink transmission on the C-link, including PUSCH/PUCCH without HARQ-ACK (that may or may not include any of SR, LRR, or CSI), SRS, (and PRACH on any cell other than PCell) is evaluated as a low-priority. Such behavior can be beneficial, for example, to prioritize C-link only for the case of PRACH transmission or for HARQ-ACK reporting that can be important for acknowledgment of periodic or semi-persistent beam indications for NCR access link that are provided by RRC or downlink MAC-CE signaling. Otherwise, BH-link is prioritized.

For example, PRACH transmission (on the PCell) and any PUSCH/PUCCH transmission with one or more of HARQ-ACK information, SR, and LRR is evaluated as a high-priority for the C-link, and any other uplink transmission on the C-link, including PUSCH/PUCCH with CSI, PUSCH without any UCI, SRS, (and PRACH on any cell other than PCell) is evaluated as a low-priority. Such behavior can be beneficial, for example, to limit the high-priority uplink transmissions on the C-link to only PRACH transmission or UCI transmissions other than CSI that are evaluated more important, otherwise BH-link is prioritized.

In one example, the realizations and examples herein can be modified by removing the "PRACH transmission (on the PCell)" from the list of high-priority uplink transmissions for the C-link, for example, because the NCR-MT is not expected to transmit PRACH except for the case of beam failure recovery (BFR) or radio link failure (RLF), in which case the NCR-Fwd is OFF or not forwarding any uplink transmissions on the BH-link, or because PRACH triggers other than BFR or RLF are evaluated to be low-priority triggers. Accordingly, at least for the purpose of prioritization of overlapping uplink transmissions on the C-link and BH-link, PRACH transmission (on the PCell or on any other cell) for the C-link is evaluated as a low-priority. For example, PUCCH/PUCCH transmission with HARQ-ACK information is evaluated as a high-priority uplink transmission for the C-link and any other uplink transmission on the C-link, including PRACH (on the PCell or any other cell), PUSCH/PUCCH without HARQ-ACK (that may or may not include any of SR, LRR, or CSI), or SRS is evaluated as a low-priority. For example, PUCCH/PUCCH transmission with UCI is evaluated as a high-priority uplink transmission for the C-link and any other uplink transmission on the C-link, including PRACH (on the PCell or any other cell), PUSCH without UCI, or SRS is evaluated as a low-priority. Other examples can be constructed similarly.

Similar to C-link, uplink transmissions on the BH-link can be categorized as high priority or low priority. For example, an uplink transmission that is amplify-and-forwarded on the BH-link by the NCR-Fwd in a time domain resource can be categorized as high priority or low priority based on a priority flag or a priority ordering associated with a beam indication provided for the NCR-Fwd access link for a corresponding time domain resource. For example, the time domain resource overlaps with a slot or symbol for the first uplink transmission on the C-link as described in the previous embodiments and examples.

For a NCR-Fwd, the time domain resource for the uplink transmission on the BH-link is an offset, equal to the internal delay of the NCR-Fwd, from a corresponding time domain resource for the uplink reception on the access link. For example, the time domain resource on the BH-link after applying the offset equal to the internal delay of the NCR-Fwd overlaps with a slot or symbol for the first uplink transmission on the C-link as described in the previous embodiments and examples.

A prioritization of an uplink transmission by the NCR-Fwd on the Access link can be predetermined in the specifications of the system operations or can be (pre)configured by OAM, or by a SIB, or by common or dedicated RRC information or signaling.

For example, a priority flag can be provided by RRC configuration for each list of periodic or semi-persistent beam indications for NCR-Fwd access link. For example, the priority flag gives priority to a periodic or semi-persistent beam indication, in a time domain resource from the list, over an aperiodic beam indication for NCR-Fwd access link that corresponds to the same time domain resource. For example, the following prioritization rule/ordering (additionally) applies among different types of beam indications for the access link of NCR-Fwd:

First, aperiodic beam indication

Second, semi-persistent beam indication

Third, periodic beam indication

Also, between two aperiodic beam indications corresponding to a same or overlapping time domain resources, the latest aperiodic beam indication is prioritized.

For example, an uplink transmission corresponding to periodic beam indication with priority flag can be prioritized over an uplink transmission corresponding to semi-persistent beam indication without priority flag. In another example, the reverse order holds, so, an uplink transmission corresponding to semi-persistent beam indication without priority flag can be prioritized over an uplink transmission corresponding to periodic beam indication with (or without) priority flag.

For example, the following priority ordering can be evaluated for uplink transmission on the NCR-Fwd access link in a time domain resource and imply a same priority ordering for uplink transmissions in the same time domain resource on the NCR-Fwd BH link:

First, semi-persistent beam indication with priority flag

Second, periodic beam indication with priority flag

Third, aperiodic beam indication

Fourth, semi-persistent beam indication without priority flag

Fifth, periodic beam indication without priority flag

For example, the first and second items in the priority ordering herein may be combined, where in one option, the NCR-Fwd does not expect both semi-persistent beam indication with priority flag and periodic beam indication with priority flag to be provided for same/overlapping time domain resources. In another option, both semi-persistent beam indication with priority flag and periodic beam indication with priority flag may/can be provided for same/overlapping time domain resources, and handling/prioritization is left to NCR implementation.

For example, similar evaluations can hold for combining the fourth and fifth items in the priority ordering herein, that is, a same priority order/level for both semi-persistent beam indication with priority flag and periodic beam indication with priority flag.

Accordingly, a first set of uplink transmissions from the list herein can be evaluated as high-priority for the NCR-Fwd access link and imply a same high-priority for corresponding uplink transmissions on the NCR 610 BH-link and a second set/remaining of uplink transmissions from the list herein can be evaluated as low-priority for the NCR-Fwd access link and imply a same low-priority for the corresponding uplink transmissions on the NCR 610 BH-link. For example, the first and second sets are mutually exclusive, and their union includes all the uplink transmissions on the Access link/BH-link.

For example, uplink transmissions on the BH-link that correspond to semi-persistent beam indications with priority flag, periodic beam indications with priority flag, or aperiodic beam indications on the NCR-Fwd access link can be evaluated as high-priority while uplink transmissions on the BH-link that correspond to semi-persistent beam indications without priority flag or periodic beam indications without priority flag can be evaluated as uplink transmissions with low-priority.

For example, uplink transmissions on the BH-link that correspond to semi-persistent beam indications with priority flag or periodic beam indications with priority flag on the NCR-Fwd access link can be evaluated as uplink transmissions with high-priority on the BH-link while uplink transmissions on the BH-link that correspond to aperiodic beam indications, or semi-persistent beam indications without priority flag, or periodic beam indications without priority flag can be evaluated as uplink transmissions with low-priority.

FIG. 13 can be modified to conform to the fourth realization described herein, wherein the BH-link is prioritized over the C-link in case of same priority level between C-link and BH-link: the only necessary change is to modify the step 1350 as follows: "In response to the first and the second uplink transmissions having same priority, the NCR prioritizes the second uplink transmission over the first uplink transmission."

In one example, the NCR 610 does not expect to be provided configuration or scheduling information for more than one uplink transmission on the C-link for a symbol or slot, and the UE 116 does not expect to be provided beam indications for the NCR-Fwd access link that imply more than one uplink transmission on the BH-link for a time domain resource that overlaps with the symbol or slot.

In one realization, the NCR 610 can receive configuration or scheduling information for multiple uplink transmissions on the C-link for a symbol or slot, or beam indications for the NCR-Fwd access link that imply multiple uplink transmissions on the BH-link for a time domain resource that overlaps with the symbol or slot. Such scenario can be applicable, for example, when the NCR-MT or NCR-Fwd operates with multiple panels/beams/antenna arrays or with multiple (serving) cells or passbands.

According to this realization, the NCR 610 determines a highest priority uplink transmission on the C-link, among the multiple uplink transmissions on the C-link, or determines a highest priority uplink transmission on the BH-link, among the multiple uplink transmissions on the BH-link, for example, based on the previously described methods and examples. Then, in one option, the highest priority uplink transmission on the C-link is prioritized over the highest priority uplink transmission on the BH-link. In another option, the highest priority uplink transmission on the BH-link is prioritized over the highest priority uplink transmission on the C-link.

When a NCR supports different uplink transmissions on different (serving) cells or passbands in a same time domain resource on C-link or BH-link, the NCR 610 applies such prioritization between C-link and BH-link per (serving) cell or per passband. Therefore, a first uplink transmission on C-link can be prioritized on a first (serving) cell or passband and a second uplink transmission on BH-link can be prioritized on a second (serving) cell or passband, wherein both the first and the second uplink transmissions corresponds to same/overlapping time domain resources.

In one example, a NCR can support C-link (only) on the PCell, while BH-link can be on one or more SCells. For example, since the PCell is prioritized over SCells, an uplink transmission on the C-link is prioritized over an uplink transmission of the SCell.

In another example, a NCR can support C-link (only) on the PCell while the BH-link can also be on the PCell or can be only on one or more SCells. For example, an uplink transmission on the C-link on the PCell is prioritized over an uplink transmission of the BH-link on an SCell while determination of a prioritized uplink transmission between C-link and BH-link can be based on a type of signal or channel of the C-link or based on a priority flag or a beam indication type for a corresponding uplink transmission on the access link when the uplink transmission on the BH-link is on the PCell.

FIG. 14 is based on the third realization described herein, wherein the C-link is prioritized over BH-link in case time-overlapping transmissions have same priority. FIG. 14 can be modified to conform to the fourth realization described herein, wherein the BH-link is prioritized over the C-link in case time-overlapping transmissions have same priority between C-link and BH-link: the only necessary change is to modify the step 1450 as follows: "In response to the first and the second uplink transmissions having same priority, the NCR prioritizes the second uplink transmission over the first uplink transmission."

Figure 15:
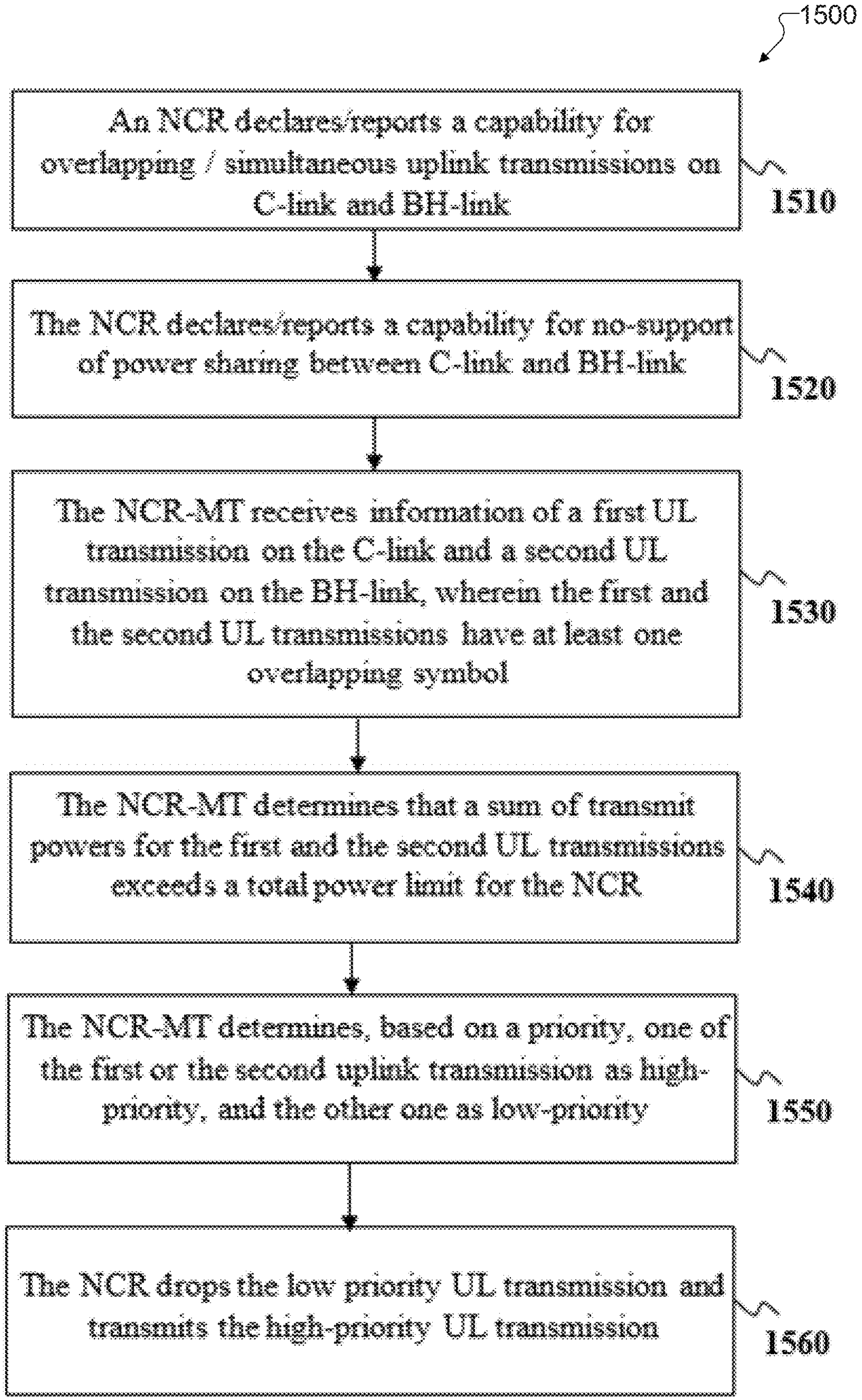
FIG. 15 illustrates a flowchart of an example NCR procedure for dropping low priority UL transmissions according to embodiments of the present disclosure.

FIG. 15 illustrates a flowchart of an example NCR procedure 1500 for dropping low priority UL transmissions according to embodiments of the present disclosure. For example, procedure 1500 for dropping low priority UL transmissions can be performed be either NCR 610 or NCR 710. This example is for illustration only and other embodiments can be used without departing from the scope of the present disclosure.

The procedure begins in 1510, a NCR declares/reports a capability for overlapping/simultaneous uplink transmissions on C-link and BH-link. In 1520, the NCR 610 declares/reports a capability for no-support of power sharing between C-link and BH-link. In 1530, the NCR-MT receives information of a first UL transmission on the C-link and a second UL transmission on the BH-link, wherein the first and the second UL transmissions have at least one overlapping symbol. In 1540, the NCR-MT determines that a sum of transmit powers for the first and the second UL transmissions exceeds a total power limit for the NCR 610. In 1550, the NCR-MT determines, based on a priority, one of the first or the second uplink transmission as high-priority, and the other one as low-priority. In 1560, the NCR 610 drops the low priority UL transmission and transmits the high-priority UL transmission.

Figure 16:
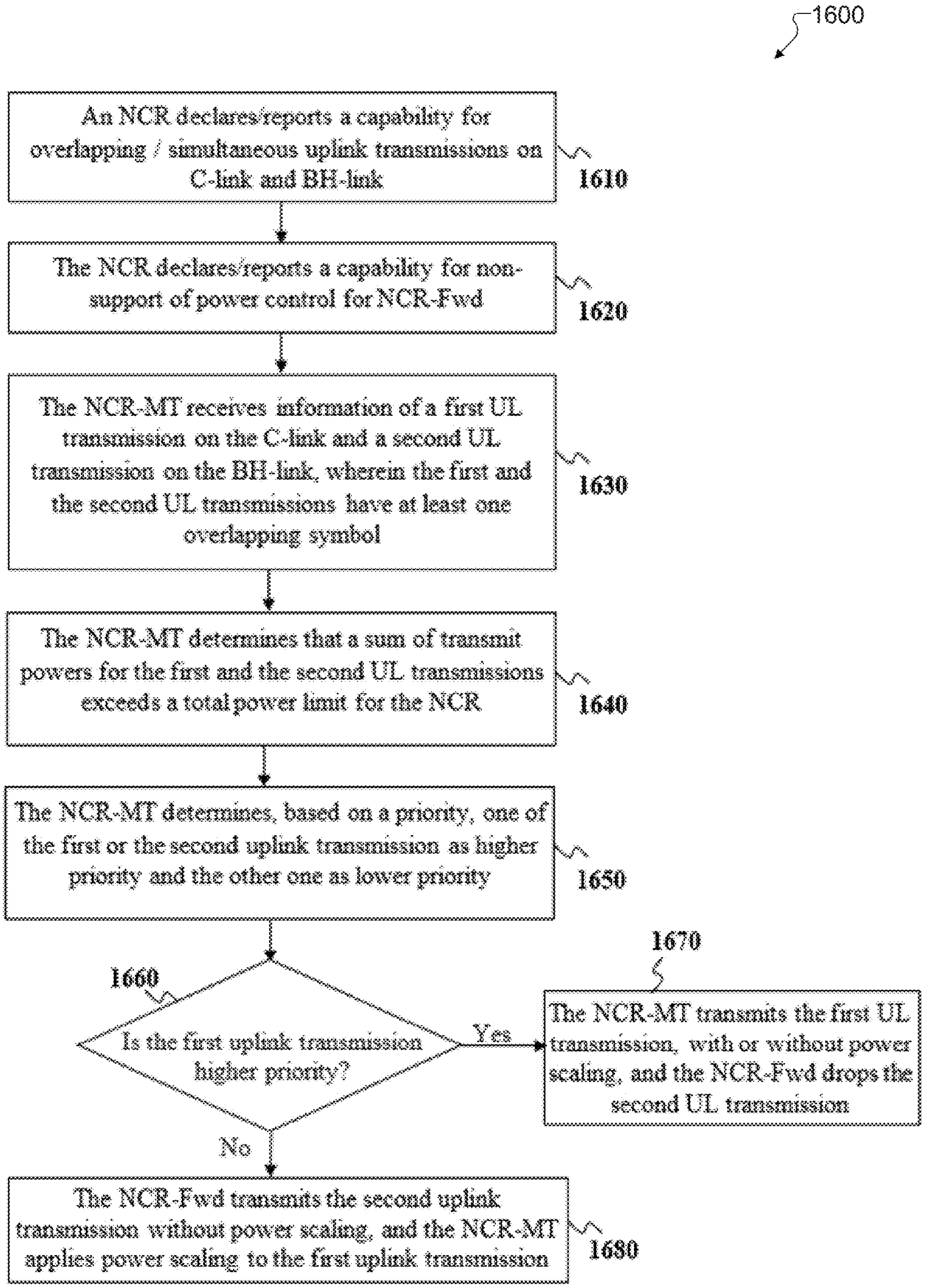
FIG. 16 illustrates a flowchart of an example NCR procedure for power sharing according to embodiments of the present disclosure.

FIG. 16 illustrates a flowchart of an example NCR procedure 1600 for power sharing according to embodiments of the present disclosure. For example, procedure 1600 for power sharing can be performed by either NCR 610 or NCR 710 in wireless network 100 of FIG. 1. This example is for illustration only and other embodiments can be used without departing from the scope of the present disclosure.

The procedure begins in 1610, a NCR declares/reports a capability for overlapping/simultaneous uplink transmissions on C-link and BH-link. In 1620, the NCR 610 declares/reports a capability for non-support of (or does not report a capability for support of or reports an incapability for) power control for NCR-Fwd (only power control/reduction for NCR-MT). In 1630, the NCR-MT receives information of a first uplink transmission on the C-link and a second uplink transmission on the BH-link, wherein the first and the second UL transmissions have overlapping symbols. In 1640, the NCR-MT determines that a sum of transmit powers for the first and the second UL transmissions exceeds a total power limit for the NCR 610. In 1650, the NCR-MT determines, based on a priority order, one of the first or the second uplink transmission as higher priority, and the other one as lower priority. In 1660, the NCR 610 determines whether the first uplink transmission for a channel/signal is high priority or lower priority than the second uplink transmission. In 1670, in response to the first uplink transmission being higher priority than the second uplink transmissions, the NCR-MT transmits the first UL channel/signal, with or without power scaling, and the NCR-Fwd drops the second UL transmission. In 1680, in response to the first uplink transmission being lower priority than the second uplink transmission, the NCR-Fwd transmits the second uplink transmission without power scaling, and the NCR-MT applies power scaling to the first uplink transmission so that a sum of transmit powers for the first and the second uplink transmissions does not exceed the total power limit.

Figure 17:
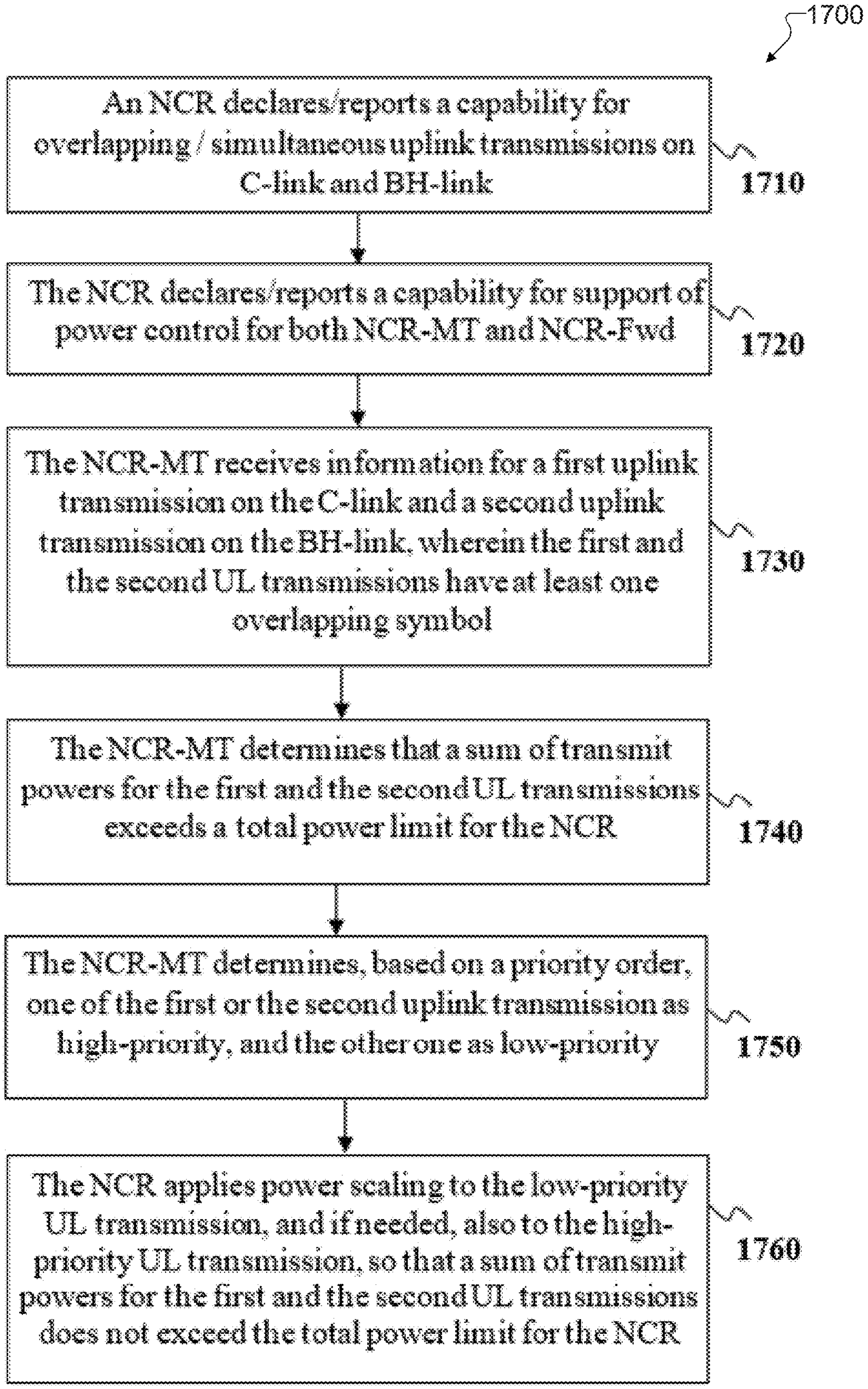
FIG. 17 illustrates a flowchart of an example NCR procedure for power sharing according to embodiments of the present disclosure.

FIG. 17 illustrates a flowchart of an example NCR procedure 1700 for power sharing according to embodiments of the present disclosure. For example, for power sharing can be performed by either NCR 610 or NCR 710 in wireless network 100 of FIG. 1. This example is for illustration only and other embodiments can be used without departing from the scope of the present disclosure.

The procedure begins in 1710, a NCR declares/reports a capability for overlapping/simultaneous uplink transmissions on C-link and BH-link. In 1720, the NCR 610 declares/reports a capability for support of power control for both NCR-MT and NCR-Fwd. In 1730, the NCR-MT receives information for a first uplink transmission on the C-link and for a second uplink transmission on the BH-link, wherein the first and the second UL transmissions have at least one overlapping symbol. In 1740, the NCR-MT determines that a sum of transmit powers for the first and the second UL transmissions exceeds a total power limit for the NCR 610. In 1750, the NCR-MT determines, based on a priority order, one of the first or the second uplink transmission as high-priority, and the other one as low-priority. In 1760, the NCR 610 applies power scaling to the low-priority UL transmission, and if needed, also to the high-priority UL transmission, so that a sum of transmit powers for the first and the second UL transmissions does not exceed the total power limit for the NCR 610.

In one example, an NCR may be subject to individual respective power limits for C-link and BH-links, without being subject to a total power limit across the C-link and BH-link. Alternatively, the NCR may be subject to a total power limit that is equal to or exceeding a sum of the individual power limits for C-link and BH-link. In such example, each of NCR-MT and NCR-Fwd operate within the individual respective power limits, without need for any power sharing/allocation, regardless of any overlap or no overlap between UL transmissions on the C-link and BH-link.

When a NCR:

supports simultaneous/overlapping uplink transmissions on the C-link and backhaul link (BH-link), supports or is configured a total power limit for NCR across the C-link and BH-link that is smaller than a sum of the individual power limits for C-link and BH-link, and/or is provided configuration or scheduling or beam indication information for simultaneous/overlapping uplink transmissions on the C-link and BH-link, with a sum power that exceed the total power limit, in a first realization, the NCR 610 may not support a capability for power sharing between C-link and BH-link, and the NCR 610 determines, based on priority rules, to transmit uplink on only one of the C-link or the BH-link and to drop the uplink transmission on the other link. In a second realization, the NCR 610 supports power sharing between C-link and BH-link, and the NCR 610 reduces (including to zero) transmission power for uplink transmissions on one or both of the C-link and BH-link, such that a sum power after power reduction does not exceed the total power limit for the NCR 610. A NCR can also support other modes of power sharing, such as dynamic power sharing with or without look ahead, semi-static power sharing, or single uplink operation, or power sharing for Dual Connectivity, such as LTE DC, NR DC, EN-DC (EUTRA-NR DC), NE-DC (NR-EUTRA DC), and so on.

According to the first realization, a capability for power sharing between C-link and BH-link can be separate (such as separate UE feature group or a separate component of a same UE feature group) from a capability for simultaneous/overlapping uplink transmissions on the C-link and BH-link. For example, the latter capability can exclusively or additionally apply when a NCR operates with separate antenna arrays, RF chains, or power supplies for the C-link and BH-link, therefore a power-limited case (with sum power of simultaneous/overlapping uplink transmissions on the C-link and BH-link exceeding the total power limit for the NCR 610) is not expected. For example, a total power limit across MT/Fwd is not applicable/defined, or a total power limit is equal to (or exceeding) a sum of the individual power limits for MT and Fwd.

For example, the capability for simultaneous/overlapping uplink transmissions on the C-link and BH-link applies only when the NCR 610 is not power limited, wherein a sum power of simultaneous/overlapping uplink transmissions on the C-link and BH-link does not exceed a total power limit for the NCR 610 across the C-link and the BH-link. For example, when a sum power of simultaneous/overlapping uplink transmissions on the C-link and the BH-link exceeds a total power limit for the NCR 610, the NCR 610 supports uplink transmission on only one of the C-link or the BH-link and drops uplink transmission on the other link. For example, NCR determination of a link to drop can be predetermined in the specifications of the system operation or (pre)configured by OAM or provided by higher layer signaling such as SIB or common or dedicated RRC information or signaling. For example, dropping uplink transmissions on one of the C-link or the BH-link can be based on prioritization ordering/rules/configuration such as those described one or more examples described herein, or can be based on a (reference) TDM configuration. Such behavior can be beneficial, for example, when the NCR 610 operates with a same antenna array, RF chain, or power supply for the C-link and BH-link, while the NCR 610 is not capable of power control for the NCR-Fwd (or NCR-MT).

According to the second realization, a NCR can report a same capability or separate capabilities for:

simultaneous/overlapping uplink transmissions on the C-link and BH-link, and power sharing between C-link and BH-link.

For example, the NCR 610 is capable of power control for one or both of NCR-MT and NCR-Fwd. For example, the NCR 610 can indicate different capabilities or different values for a power sharing capability as: {only power control the NCR-MT/C-link; or power control both the NCR-MT/C-link and NCR-Fwd/BH-link, or power control only the NCR-Fwd/BH-link}. For example, NCR-MT power control may be considered as default NCR procedure, and only NCR-Fwd power control is considered as an optional capability. For example, such NR-Fwd power control can be a separate UE feature group or a separate component of a same UE feature group.

Various capabilities considered throughput the present disclosure can be indicated as manufacturer's declaration, via OAM, or over-the-air such as RRC signaling. A incapability for a certain NCR procedure can be indicated by explicitly indicating such incapability, or by not indicating a corresponding capability.

When a NCR supports power sharing between C-link and BH-link, and a sum power for simultaneous/overlapping uplink transmissions on the C-link and BH-link exceeds a total power limit for NCR across both the C-link and the BH link, in a first method, a transmission power of uplink transmissions (only) on the C-link is reduced (including to zero) such that a sum power across C-link and BH-link does not exceed the total power limit for the NCR 610. For example, power reduction does not apply to NCR-Fwd, and the NCR 610 does not apply transmit power reduction or dropping to uplink transmissions on the BH-link. Such method can be predetermined or (pre)configured for the NCR 610 or can apply when the NCR 610 indicates a capability for power sharing by applying power control only to transmissions of NCR-MT or when the NCR 610 is not capable of NCR-Fwd power control. For example, power reduction of the uplink transmissions on the C-link applies regardless of any priority levels/ordering/configuration for the uplink transmissions on the C-link or access/backhaul link.

In a second method, the NCR 610 applies power sharing, based on prioritization rules, for transmissions from both NCR-MT or NCR-Fwd, wherein a transmit power for NCR-MT can be reduced (including to zero) as determined by the prioritization rules, while the NCR-Fwd does not reduce a transmit power but may drop uplink transmissions on the BH-link when the NCR 610 determines that uplink transmissions on the BH-link have low priority or need to be power adjusted. Such behavior can be beneficial, for example, when priority orders are to be evaluated for power sharing, while allowing a NCR-Fwd that may not support power control on the BH-link. In one example, a transmit power reduction for a first uplink transmission on the C-link may be maintained even if a second uplink transmission is determined to be dropped on the BH-link in a next level/step of the priority order for power sharing. In another example, when a NCR determines to drop uplink transmissions on the BH-link in any later levels/steps of the priority order for power sharing (for example, with higher priority), the NCR 610 can determine to not apply power reduction or can determine to apply a different power reduction to uplink transmissions on the C-link in any earlier levels/steps of the priority order for power sharing (for example, with lower priority). Therefore, a NCR-MT can determine a transmission power for the uplink transmission on the C-link after determining whether or not uplink transmissions on the backhaul link are dropped.

In a third method, the NCR 610 may be capable of power reduction for both of NCR-MT/C-link and NCT-Fwd/BH-link. For example, prioritization or power sharing rules between NCR-MT and NCR-Fwd can be predetermined in the specifications of the system operation or (pre)configured by OAM or provided by higher layer signaling such as SIB or common or dedicated RRC information or signaling. For example, the NCR 610 allocates power to uplink transmissions according to a priority order (in descending order) so that a sum transmit power for uplink transmissions on C-link and BH-link is smaller than or equal to the total power limit for the NCR 610 in every symbol of corresponding time domain resources. For example, the priority order can be as in one or more methods and examples described herein. For example, the NCR 610 first reduces power (including to zero power) for a lowest priority uplink transmission, and then, if needed, reduces power (including to zero power) for a second lowest priority uplink transmission, and so on, until the sum transmit power does not exceed the total power limit for the NCR 610.

In one example, such as for a NCR that supports semi-static power sharing between C-link and BH-link, the figure herein holds with some modifications. For example, prioritization rule such as those in steps 1750 and 1760 may not apply. Instead, the NCR 610 can be provided (by higher layer configuration, such as OAM, SIB, or RRC) separate limits P_cmax_NCR-MT and P_cmax_NCR-Fwd, and the NCR-MT applies power scaling/reduction to the first uplink transmission so that P_C-link≤P_cmax_NCR-MT, or the NCR-Fwd applies power scaling/reduction to the second uplink transmission so that P_BH-link≤P_cmax_NCR-Fwd. For example, a sum of the individual limits is smaller than or equal to the joint power limit.

In another example, the separate power limits for semi-static power sharing are applicable, while an ordering of power scaling can be based on prioritization rule such as those in steps 1750 and 1760. For example, when first UL transmission has lower priority than the second UL transmission, first the NCR-MT applies power scaling/reduction to the first uplink transmission so that P_C-link≤P_cmax_NCR-MT. If after such first power scaling on the C-link a sum transmit power for the first and the second UL transmissions does not exceed the total NCR power limit (P_cmax_NCR), the NCR-Fwd does not apply power scaling to the second UL transmission on the BH-link (for example, even if P_BH-link>P_cmax_NCR-Fwd). If after the first power scaling on the C-link a sum transmit power for the first and the second UL transmissions still exceeds the total NCR power limit (P_cmax_NCR), the NCR-Fwd applies power scaling to the second UL transmission on the BH-link so that P_BH-link≤P_cmax_NCR-Fwd.

In various realizations, a total power limit for the NCR 610 across the C-link and BH-link can be defined as P_cmax_NCR and can be associated with a maximum configured or allowed output power or power level. P_cmax_NCR may be fixed and set based on RF transceiver manufacturer specification, or may be provided by configuration, OAM or indicated by a gNB. One or multiple values may be used to indicate and/or determine a value for P_cmax_NCR. For example, an actual maximum output power level for transmissions by the NCR 610 may be determined by the NCR 610 using a maximum supported output power value adjusted by a power reduction factor. Separate values for a maximum configured or allowed output power may be determined by the NCR 610 based on one or a combination of an NR operating band, channel BW or passband, presence or absence of NCR C-link, additional power reduction values, a maximum, average or allowed time-domain duty cycle. For example, a NCR can support a power class such as power class 3 for NCR-MT, wherein a corresponding maximum configured power level for the NCR-MT can be no larger than P_cmax_NCR-MT. For example, P_cmax_NCR-MT≤P_cmax_NCR. In another example, a NCR_MT-specific power limit such as power class 3 is not applicable to NCR-MT, and the NCR-MT can transmit an uplink signal or channel on the C-link with a power up to P_cmax_NCR. In one example, P_cmax_NCR=P_cmax_NCR-Fwd, wherein P_cmax_NCR-Fwd is a nominal/target/maximum output power level for NCR-Fwd.

A maximum configured, allowed or actual output or transmit power level for NCR-MT UL transmissions using the C-link or NCR BH-link transmissions may be determined with respect to a reference time duration or period. The reference time duration or period may be fixed by system operating specifications, or may be configured by gNB signaling, or may be configured using NCR configuration or OAM. Different types of signals/channels or UL transmissions, or different types of NCR links, i.e., C-link and BH-link, respectively, may use separate settings or values for a reference time duration or period.

For example, a reference time duration or period to determine an actual or allowed or maximum transmission power level by the NCR 610 may correspond to a slot duration. In another example, a transmission power level of the BH-link may be determined with respect to an averaged value across multiple slots, e.g., transmission power on the BH-link is determined by the NCR 610 based on NCR-Fwd transmissions in slots corresponding to a time duration of T_BH_AVERAGE=100 msec. A reference time duration or period to determine a maximum, configured, allowed, or actual transmission power level of a C-link transmission may be similarly configured, indicated, or provided. BH-link and C-link, respectively, may be configured or indicated separate values for a reference time duration. For example, actual transmission power for BH-link transmissions may be determined using T_BH_AVERAGE=100 msec and actual transmission for C-link transmissions may be determined for a slot period, e.g., T_C_AVERAGE=0.125 msec for SCS=120 kHz. When a NCR implements power sharing capability, dropping, scaling, or prioritization of an UL transmission may then be based on a long-term average value for the BH-link and a short-term estimation for the required transmission power of a C-link transmission.

For example, a NCR may implement power sharing between the C-link and the BH-link according to at least one of the following types. A first type of NCR, with respect to power sharing between C-link and BH-link, may be a NCR that supports dynamic power sharing (DPS) between C-link and BH-link and a second type of NCR may be a NCR that does not support DPS, i.e., may use semi-static power sharing. A third type of NCR, with respect to power sharing, may be a NCR supporting single UL operation (SUO). A NCR may inform the gNB 102 to which category it belongs with a NCR capability parameter such as dynamicPowerSharing or semiStaticPowerSharing for example with values as supported or not supported. Other power sharing modes may be also possible for a NCR as previously described.

For example, a NCR that is not of the first type, i.e., does not support DPS, cannot coordinate C-link and BH-link transmission powers. For example, a transmission power for the C-link and for the BH-link, respectively, is set independently according to a configured or an actual transmission power of the C-link and BH-link, respectively, up to a corresponding maximum configured transmission power for the C-link and the BH-link, respectively, without knowledge of the configured or actual transmission power of the other link by a NCR of the second type. Therefore, the NCR 610 of the second type may rely on the gNB 102 to guarantee by scheduling that P_C-Link+P_BH-Link≤P_cmax_NCR or, in other words, that the combined output power of C-link and the BH-link does not exceed the NCR 610's output power capabilities. For example, the NCR-MT operates with an P_cmax_NCR-MT and the NCR-Fwd operates with P_cmax_NCR-Fwd, such that P_cmax_NCR-MT+P_cmax_NCR-Fwd≤P_cmax_NCR, and the NCR 610 determines a transmit power for C-link such that P_C-Link≤P_cmax_NCR-MT and P_BH-Link≤P_cmax_NCR-Fwd. In one example, the NCR 610 applies such limits regardless of whether uplink transmissions on the C-link and BH-link overlap. In another example, the NCR 610 applies such limits only when uplink transmissions on the C-link and BH-link overlap and do not apply the limits P_C-Link≤P_cmax_NCR-MT or P_BH-Link≤P_cmax_NCR-Fwd when corresponding uplink transmissions do not overlap. For example, in case of no overlap, the only constraint is to not exceed the total power limit P_cmax_NCR. In one example, in an event that P_C-Link+P_BH-Link may exceed P_cmax_NCR, the network 130 may configure the NCR 610 of the second type with a TDM pattern for single transmission of the C-link or the BH-link at a time, e.g., for a symbol or a slot or sets of symbols or slots. For example, for the case of a NCR of the third type, wherein C-link or BH-link are transmitted in a time-multiplexed manner by a NCR, there may be a need to support a TDM pattern for the NCR 610 of the third type with single UL transmission capability. For example, a TDM pattern can be provided by a single time pattern, such as a reference TDD pattern, or by separate TDD patterns for uplink transmission by NCR-MT and by NCR-Fwd. For example, the two TDD patterns are not expected to indicate a same symbol or slot as uplink for both NCR-MT and NCR-Fwd. In another example, the two TDD patterns can indicate a symbol or slot as uplink for both NCR-MT and NCR-Fwd, in which case, the NCR determines to transmit on only one (or both of) NCR-MT and NCR-Fwd, based on the NCR capability, and based on prioritization rules, such as only transmit on the NCR-MT, or based on UL signals or channel of the C-link or the beam indication time for the Access link, and so on as previously described. For example, the two TDD patterns can be associated with a same SCS or numerology or with different SCS or numerology. For example, one of the two TDD patterns can be a cell-specific TDD pattern or a dedicated TDD pattern for the NCR. In another example, a TDM pattern may not be needed for a NCR of the second type or the third type, and the NCR 610 determines to transmit on only one of C-link or BH-link based on predetermined or (pre)configured rules, such as prioritizations rules as previously described and further described subsequently.

For a NCR of the first type supporting DPS, the NCR 610 modem transceiver may be aware of the configured or actual transmission powers of C-link and BH-link, respectively. Transmission powers and radio resource allocation properties of the C-link and BH-link transmissions, respectively, can be known and accounted for by the NCR 610 when determining a maximum transmission power such that the NCR 610 can ensure that the NCR 610's maximum output power capability, that is, P_cmax_NCR, is not exceeded. For example, NCR-MT or NCR-Fwd can reduce transmit power (including to zero power, that is, dropping) for overlapping uplink transmissions on any or both of C-link or BH-link so that P_C-link+P_BH-link does not exceed P_cmax_NCR in any symbol or slot. For example, determination of transmit powers for the uplink transmissions in a symbol can be based on uplink transmissions only up to the symbol (that is, without look-ahead evaluated the power for later transmissions), or can be also based on uplink transmissions after the symbol, such as up to T_lookahead symbols/slots/msec after the symbol (that is, with look-ahead evaluated the power for later transmissions). Support or no support of look-ahead can be based on NCR capability.

For example, the NCR-Fwd need not be aware of the C-link transmission power or radio resource allocation properties for the NCR-MT transmissions and, thus, may set its output power regardless of the C-link transmissions. If P_C-link+P_BH-link exceeds P_cmax_NCR, then the NCR 610 scales the C-link transmission power down to satisfy P_C-link+P_BH-link=P_cmax_NCR. For example, if the amount of necessary power scaling is more a gNB signalled value ncrScale, then the NCR 610 is allowed to drop the C-link transmission, that is, not to transmit the NCR-MT UL transmissions using the C-link at all for that symbol or slot or for the entire transmission. In another example, similar principles can be applied to the converse scenario, e.g., where a transmission power for the C-link transmissions is determined by the NCR-MT regardless of the BH-link transmission power. The BH-link transmission power is then scaled to meet the P_cmax_NCR power level.

In various examples, when determining transmit powers or a sum transmit power for uplink transmissions on C-link and BH-link in a symbol of corresponding time domain resources, in one option, the NCR 610 does not include power for transmissions starting after the symbol of the corresponding time domain resources (referred to as, "no look-ahead"). For example, the sum transmit power in a symbol of a slot is defined as the sum of the linear values of NCR-MT or NCR-Fwd transmit powers for corresponding uplink transmissions in the symbol of the slot. In another option, determination of transmit powers or a sum power for uplink transmissions in a symbol can be based on uplink transmissions after the symbol, such as up to T_lookahead symbols/slots/msec after the symbol (that is, with look-ahead). Support or no support of look-ahead can be based on NCR capability.

In various examples, a symbol in simultaneous/overlapping part of uplink transmissions can be with respect to a corresponding uplink transmission and a corresponding SCS. In another example, the symbol is with respect to an SCS configuration for an active UL BWP of a corresponding serving cell for the NCR-MT, or a smallest or largest SCS among UL BWPs of serving cells for the NCR-MT. In another example, the symbol is with respect to an SCS configuration for a corresponding serving cell/carrier or passband for the NCR-Fwd, or a smallest or largest SCS among serving cells/carriers or passband for the NCR-Fwd. In another example, the symbol is with respect to a smallest or largest SCS configuration among different serving cells/carriers or passbands for any of NCR-MT and NCR-Fwd. For example, the symbol is with respect to an SCS provided for a time domain resource or a list/set of time domain resources within a beam indication for the NCR 610 Access link corresponding to the uplink transmission on the BH-link. For example, when multiple uplink transmissions on the BH-link overlap with one or more uplink transmissions on the C-link, the symbol can be with respect to a largest (or a smallest) SCS configuration provided for time domain resources or lists/sets of time domain resources within beam indications provided for the NCR 610 Access link corresponding to the multiple uplink transmissions on the BH-link.

In one example, the NCR 610 applies power sharing between C-link and BH-link based on measurements, such as measurements of power or energy per resource element (EPRE) or RSRP or pathloss, from uplink transmissions received at the NCR-Fwd in a time window and comparison with a threshold. For example, a length of the time window for NCR measurements and a threshold for comparison can be predetermined in the specifications of system operations or can be (pre)configured by OAM, or by a SIB, or by common or dedicated RRC information or signaling. For example, a length of a time window for NCR measurements can includes values such as tens or hundreds of milliseconds.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method for a network-controlled repeater (NCR) in a wireless system, the method comprising:

receiving, by an NCR mobile termination (NCR-MT) entity:

first information for a first uplink transmission by the NCR-MT entity on a control link (C-link) of the NCR, and second information for a second uplink transmission by an NCR forward (NCR-Fwd) entity on a backhaul link (BH-link) of the NCR, wherein the second uplink transmission overlaps with the first uplink transmission in one or more symbols;

identifying, by the NCR-MT entity, a power limit for simultaneous transmission by the NCR-MT entity and by the NCR-Fwd entity;

determining, by the NCR-MT entity:

a first power for the first uplink transmission and a second power for the second uplink transmission, and in response to a sum of the first power and the second power in the one or more symbols exceeding the power limit, a third power for the first uplink transmission and a fourth power for the second uplink transmission, wherein a sum of the third power and the fourth power does not exceed the power limit; and transmitting, by the NCR-MT entity, the first uplink transmission with the third power in the one or more symbols; and transmitting, by the NCR-Fwd entity, the second uplink transmission with the fourth power in the one or more symbols.

2. The method of claim 1, further comprising:

receiving, by the NCR-MT entity:

third information for a first configured maximum power limit for the NCR-MT entity, and fourth information for a second configured maximum power limit for the NCR-Fwd entity, wherein:

the first power and the third power do not exceed the first configured maximum power limit, the second power and the fourth power do not exceed the second configured maximum power limit, and the power limit is smaller than a sum of the first configured maximum power limit and the second configured maximum power limit.

3. The method of claim 1, further comprising:

determining the third power to be same as the first power, and the fourth power to be:

zero, when (i) the NCR is not capable of simultaneous uplink transmission by both the NCR-MT entity and the NCR-Fwd entity or (ii) the NCR-Fwd entity is not capable of uplink power control, and a scaled value of the second power, otherwise.

4. The method of claim 1, further comprising:

determining, by the NCR-MT entity, a first priority for the first uplink transmission and a second priority for the second uplink transmission, when the second priority is higher than the first priority, determining the third power to be a scaled value of the first power, and the fourth power to be same as the second power, and when the first priority is higher than the second priority, determining the third power to be same as the first power, and the fourth power to be:

zero, when the NCR-Fwd entity is not capable of uplink power control, and a scaled value of the second power, otherwise.

5. The method of claim 4, wherein the first priority and the second priority are based on:

a predetermined prioritization between the NCR-MT entity and the NCR-Fwd entity, and at least one of:

a priority of a signal or channel of the first uplink transmission, a priority of a beam indication type of a third uplink reception, by the NCR-Fwd entity on an access link (AC-link) of the NCR, associated with the second uplink transmission, and an existence of a priority flag for the beam indication type of the third uplink reception.

6. The method of claim 5, wherein the beam indication type is prioritized in ascending order of:

semi-persistent beam indication with the priority flag, periodic beam indication with the priority flag, aperiodic beam indication, semi-persistent beam indication without the priority flag, and periodic beam indication without the priority flag.

7. The method of claim 1, further comprising:

receiving, by the NCR-MT entity:

third information of a first time division duplex (TDD) pattern indicating first symbols for uplink transmissions by the NCR-MT entity, and fourth information of a second TDD pattern indicating second symbols for uplink transmissions by the NCR-Fwd entity;

when the one or more symbols are included in the first symbols, determining the third power to be same as the first power and the fourth power to be zero; and when the one or more symbols are included in the second symbols and not included in the first symbols, determining the third power to be zero, and the fourth power to be same as the second power.

8. A network-controlled repeater (NCR), comprising:

a transceiver of an NCR mobile termination (NCR-MT) entity configured to receive:

first information for a first uplink transmission by the NCR-MT entity on a control link (C-link) of the NCR, and second information for a second uplink transmission by an NCR forward (NCR-Fwd) entity on a backhaul link (BH-link) of the NCR, wherein the second uplink transmission overlaps with the first uplink transmission in one or symbols;

a processor of the NCR-MT entity operably coupled to the transceiver of the NCR-MT entity, the processor of the NCR-MT entity configured to:

identify a power limit for simultaneous transmission by the NCR-MT entity and by the NCR-Fwd entity; and determine:

a first power for the first uplink transmission and a second power for the second uplink transmission, in response to a sum of the first power and the second power in the one or more symbols exceeding the power limit, a third power for the first uplink transmission and a fourth power for the second uplink transmission, wherein a sum of the third power and the fourth power does not exceed the power limit; and a transceiver of the NCR-Fwd entity operably coupled to the processor of the NCR-MT entity, the transceiver of the NCR-Fwd entity configured to transmit the second uplink transmission with the fourth power in the one or more symbols, and wherein the transceiver of the NCR-MT entity is further configured to transmit the first uplink transmission with the third power in the one or more symbols.

9. The NCR of claim 8, wherein:

the transceiver of the NCR-MT entity is further configured to receive:

third information for a first configured maximum power limit for the NCR-MT entity, and fourth information for a second configured maximum power limit for the NCR-Fwd entity, the first power and the third power do not exceed the first configured maximum power limit, the second power and the fourth power do not exceed the second configured maximum power limit, and the power limit is smaller than a sum of the first configured maximum power limit and the second configured maximum power limit.

10. The NCR of claim 8, wherein:
the processor of the NCR-MT entity is further configured to determine the third power to be same as the first power, and the fourth power to be:
zero, when (i) the NCR is not capable of simultaneous uplink transmission by both the NCR-MT entity and the NCR-Fwd entity or (ii) the NCR-Fwd entity is not capable of uplink power control, and
a scaled value of the second power, otherwise.

11. The NCR of claim 8, wherein:
the processor of the NCR-MT entity is further configured to determine a first priority for the first uplink transmission and a second priority for the second uplink transmission,
when the second priority is higher than the first priority, the processor of the NCR-MT entity is further configured to:
scale the first power to determine the third power, and determine the fourth power to be same as the second power, and
when the first priority is higher than the second priority, the processor of the NCR-MT entity is further configured to:
determine the third power to be same as the first power, and
determine the fourth power to be zero, when the NCR-Fwd entity is not capable of uplink power control, and
scale the second power to determine the fourth power, otherwise.

12. The NCR of claim 11, wherein the first priority and the second priority are based on:
a predetermined prioritization between the NCR-MT entity and the NCR-Fwd entity, and
at least one of:
a priority of a signal or channel of the first uplink transmission,
a priority of a beam indication type of a third uplink reception, by the NCR-Fwd entity on an access link (AC-link) of the NCR, associated with the second uplink transmission, and
an existence of a priority flag for the beam indication type of the third uplink reception.

13. The NCR of claim 12, wherein the beam indication type is prioritized in ascending order of:
semi-persistent beam indication with the priority flag,
periodic beam indication with the priority flag,
aperiodic beam indication,
semi-persistent beam indication without the priority flag, and
periodic beam indication without the priority flag.

14. The NCR of claim 8, wherein:
the transceiver of the NCR-MT entity is further configured to receive:
third information of a first time division duplex (TDD) pattern indicating first symbols for uplink transmissions by the NCR-MT entity, and
fourth information of a second TDD pattern indicating second symbols for uplink transmissions by the NCR-Fwd entity;
when the one or more symbols are included in the first symbols, the processor of the NCR-MT entity is further configured to determine the third power to be same as the first power and the fourth power to be zero; and
when the one or more symbols are included in the second symbols and not included in the first symbols, the processor of the NCR-MT entity is further configured to determine the third power to be zero and the fourth power to be same as the second power.

15. A base station, comprising:
a transceiver configured to transmit, to a network-controlled repeater (NCR) mobile termination (NCR-MT) entity of an NCR:
first information for a first uplink reception from the NCR-MT entity on a control link (C-link) of the NCR, and
second information for a second uplink reception from an NCR forward (NCR-Fwd) entity on a backhaul link (BH-link) of the NCR, wherein the second uplink reception overlaps with the first uplink reception in the one or more symbols;
a processor operably coupled to the transceiver, the processor configured to:
identify a power limit for simultaneous transmission by the NCR-MT entity and by the NCR-Fwd entity;
determine:
a first power for the first uplink reception and a second power for the second uplink reception, and
in response to a sum of the first power and the second power in the one or more symbols exceeding the power limit, a third power for the first uplink reception and a fourth power for the second uplink reception, wherein a sum of the third power and the fourth power does not exceed the power limit; and
wherein the transceiver is further configured to receive:
from of the NCR-MT entity, the first uplink reception, which is associated with the third power, in the one or more symbols, and
from the NCR-Fwd entity, the second uplink reception, which is associated with the fourth power, in the one or more symbols.

16. The base station of claim 15, wherein:
the transceiver is further configured to transmit, to the NCR-MT entity:
third information for a first configured maximum power limit for the NCR-MT entity, and
fourth information for a second configured maximum power limit for the NCR-Fwd entity,
the first power and the third power do not exceed the first configured maximum power limit,
the second power and the fourth power do not exceed the second configured maximum power limit, and
the power limit is smaller than a sum of the first configured maximum power limit and the second configured maximum power limit.

17. The base station of claim 15, wherein:
the processor is further configured to determine the third power to be same as the first power, and the fourth power to be:
zero, when (i) the NCR is not capable of simultaneous uplink transmission by both the NCR-MT entity and the NCR-Fwd entity or (ii) the NCR-Fwd entity is not capable of uplink power control, and
a scaled value of the second power, otherwise.

18. The base station of claim 15, wherein:
the processor is further configured to determine a first priority for the first uplink reception and a second priority for the second uplink reception,
when the second priority is higher than the first priority, the processor is further configured to:
scale the first power to determine the third power, and determine the fourth power to be same as the second power, and when the first priority is higher than the second priority, the processor is further configured to:

determine the third power to be same as the first power, and determine the fourth power to be zero, when the NCR-MT entity is not capable of uplink power control, and scale the second power to determine the fourth power, otherwise.

19. The base station of claim 18, wherein the first priority and the second priority are based on:

a predetermined prioritization between the NCR-MT entity and the NCR-Fwd entity, and at least one of:

a priority of a signal or channel of the first uplink reception, a priority of a beam indication type of a third uplink reception, by the NCR-Fwd entity on an access link (AC-link) of the NCR, associated with the second uplink reception, and an existence of a priority flag for the beam indication type of the third uplink reception.

20. The base station of claim 15, wherein:

the transceiver is further configured to transmit, to the NCR-MT entity:

third information of a first time division duplex (TDD) pattern indicating first symbols for uplink receptions from the NCR-MT entity, and fourth information of a second TDD pattern indicating second symbols for uplink receptions from the NCR-Fwd entity;

when the one or more symbols are included in the first symbols, the processor is further configured to determine the third power to be same as the first power and the fourth power to be zero; and when the one or more symbols are included in the second symbols and not included in the first symbols, the processor is further configured to determine the third power to be zero and the fourth power to be same as the second power.

* * * * *